US012686621B2

(12) United States Patent　　　　(10) Patent No.:　US 12,686,621 B2
Matsumoto　　　　　　　　　　　　(45) Date of Patent:　Jul. 21, 2026

(54) METHOD FOR PRODUCING LITHIUM METAL COMPOSITE OXIDE

(71) Applicant: Sumitomo Metal Mining Co., Ltd., Tokyo (JP)

(72) Inventor: Yuki Matsumoto, Niihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 495 days.

(21) Appl. No.: 18/021,071

(22) PCT Filed: Aug. 11, 2021

(86) PCT No.: PCT/JP2021/029642
§ 371 (c)(1),
(2) Date: Feb. 13, 2023

(87) PCT Pub. No.: WO2022/039088
PCT Pub. Date: Feb. 24, 2022

(65) Prior Publication Data
US 2024/0034640 A1　　　Feb. 1, 2024

(30) Foreign Application Priority Data
Aug. 19, 2020　　(JP) ................................ 2020-138851

(51) Int. Cl.
C01G 53/42　　　　(2025.01)

(52) U.S. Cl.
CPC .......... C01G 53/42 (2013.01); *C01P 2006/12* (2013.01); *C01P 2006/40* (2013.01)

(58) Field of Classification Search
CPC ..... C01G 53/42; C01G 51/42; C01P 2006/12; C01P 2006/40; C01P 2002/54; C01P 2002/72; C01P 2002/74; C01P 2002/76; H01M 4/485; H01M 4/525; H01M 4/505; Y02E 60/10; C01D 1/02; C01D 15/02
See application file for complete search history.

(56) References Cited

U.S. PATENT DOCUMENTS

| | | | | |
|---|---|---|---|---|
| 5,874,058 A | * | 2/1999 | Sheargold | C01G 45/1242 423/599 |
| 2005/0170250 A1 | | 8/2005 | Ohzuku et al. | |
| 2009/0104530 A1 | * | 4/2009 | Shizuka | H01M 4/525 429/223 |
| 2012/0119167 A1 | * | 5/2012 | Matsumoto | C01G 53/42 252/519.15 |
| 2013/0029216 A1 | | 1/2013 | Kim et al. | |

| | | | | |
|---|---|---|---|---|
| 2013/0337330 A1 | * | 12/2013 | Taniguchi | H01M 4/505 429/223 |
| 2014/0295274 A1 | | 10/2014 | Kim et al. | |
| 2014/0377660 A1 | | 12/2014 | Fukui et al. | |
| 2016/0093885 A1 | * | 3/2016 | Kamata | H01M 4/505 429/223 |
| 2017/0155137 A1 | * | 6/2017 | Okae | H01M 4/366 |
| 2019/0379043 A1 | | 12/2019 | Toma et al. | |
| 2022/0059834 A1 | | 2/2022 | Kuroda | |

FOREIGN PATENT DOCUMENTS

| | | | | | |
|---|---|---|---|---|---|
| CN | 104136376 A | | 11/2014 | | |
| EP | 0986115 A1 | * | 3/2000 | ............. | H01M 4/48 |
| EP | 1117145 A1 | * | 7/2001 | ........... | H01M 4/505 |
| JP | 07-114915 A | | 5/1995 | | |
| JP | 09-129229 A | | 5/1997 | | |
| JP | 09-506585 A | | 6/1997 | | |
| JP | 2001-035492 A | | 2/2001 | | |
| JP | 2006-147591 A | | 6/2006 | | |
| JP | 2008-293997 A | | 12/2008 | | |
| JP | 2012-038680 A | | 2/2012 | | |
| JP | 2019-040875 A | | 3/2019 | | |
| JP | 2020-050562 A | | 4/2020 | | |
| WO | 95/16645 A1 | | 6/1995 | | |
| WO | 2018/097137 A1 | | 5/2018 | | |
| WO | 2019/166253 A1 | | 9/2019 | | |
| WO | 2020/130123 A1 | | 6/2020 | | |
| WO | 2020/216888 A1 | | 10/2020 | | |

OTHER PUBLICATIONS

International Search Report issued in corresponding International Patent Application No. PCT/JP2021/029642, dated Sep. 14, 2021, with English translation.
Japanese Notice of Reasons for Refusal issued in corresponding Japanese Patent Application No. 2022-512750 dated May 10, 2022, with English translation.
Office Action issued in corresponding Korean Patent Application No. 10-2023-7005074, dated Dec. 18, 2025.

* cited by examiner

*Primary Examiner* — Anthony J Zimmer
(74) *Attorney, Agent, or Firm* — Rimon P.C.

(57) ABSTRACT

A method for producing a lithium metal composite oxide including a step of calcining, at 600° C. or higher, one of a mixture of a lithium compound and a metal composite compound containing at least Ni and a reactant obtained by preliminarily calcining the mixture to obtain a calcined product, a step of cooling the calcined product from a calcining temperature in the step of obtaining the calcined product to 150° C. or lower to obtain a cooled product, and a step of pulverizing the cooled product such that a BET specific surface area becomes 0.90 to 1.55 m²/g, in which, in the step of obtaining the cooled product, an average cooling rate in a temperature range from 600° C. to 150° C. is 150 to 3500° C./h.

14 Claims, 3 Drawing Sheets

METHOD FOR PRODUCING LITHIUM METAL COMPOSITE OXIDE

CROSS REFERENCE TO RELATED APPLICATIONS

This application is the U.S. National Phase under 35 U.S.C. § 371 of International Application No. PCT/JP2021/029642, filed on Aug. 11, 2021, which claims the benefit of Japanese Application No. 2020-138851, filed on Aug. 19, 2020, the entire contents of each are hereby incorporated by reference.

TECHNICAL FIELD

The present invention relates to a method for producing a lithium metal composite oxide.

Priority is claimed on Japanese Patent Application No. 2020-138851, filed in Japan on Aug. 19, 2020, the content of which is incorporated herein by reference.

BACKGROUND ART

Lithium metal composite oxides are being used as positive electrode active materials for lithium secondary batteries. Attempts of putting lithium secondary batteries into practical use not only for small-sized power sources in mobile phone applications, notebook personal computer applications, and the like but also for medium-sized or large-sized power sources in automotive applications, power storage applications, and the like have already been underway.

Methods for producing a lithium metal composite oxide include a step of calcining a mixture of a metal composite compound that is a precursor and a lithium compound. This calcining step is performed using a continuous calcining furnace such as a tunnel furnace or a roller hearth kiln or a fluidized calcining furnace such as a rotary kiln.

Patent Document 1 discloses that a lithium-containing composite oxide is calcined using a roller hearth kiln. In a calcining step using a roller hearth kiln, continuous calcining is performed by loading a substance to be calcined into a ceramic sheath box, continuously injecting the sheath box into a tunnel-like furnace, and moving the sheath box on a rotary roller.

CITATION LIST

Patent Document

[Patent Document 1]
  JP-A-2001-035492

SUMMARY OF INVENTION

Technical Problem

In methods for producing a lithium metal composite oxide, a mixture of a metal composite compound and a lithium compound is calcined, and then the cooling rate is controlled, whereby, in a lithium metal composite oxide to be obtained, the ratio ($I_1/I_2$) of the peak area ($I_1$) within a range of $2\theta=44.4\pm1°$ to the peak area ($I_2$) within a range of $2\theta=64.5\pm1°$, which are obtained by measurement by a powder X-ray diffraction method (XRD), becomes high, and the use of this lithium metal composite oxide as a positive electrode active material for a lithium secondary battery makes improvement in initial characteristics, output characteristics, and charge characteristics of lithium secondary batteries expected. However, in Patent Document 1, since the sheath box is made of ceramic, when an attempt is made to control the cooling rate, there is a possibility that the sheath box may crack if the calcined product is rapidly cooled.

The present invention has been made in view of the above circumstances, and an object of the present invention is to provide a method for producing a lithium metal composite oxide enabling the obtainment of lithium secondary batteries having improved initial characteristics, output characteristics and charge characteristics when used as a positive electrode active material for a lithium secondary battery.

Solution to Problem

The present invention has the following aspects.

[1] A method for producing a lithium metal composite oxide including a step of calcining, at 600° C. or higher, one of a mixture of a lithium compound and a metal composite compound containing at least Ni and a reactant obtained by preliminarily calcining the mixture to obtain a calcined product, a step of cooling the calcined product from a calcining temperature in the step of obtaining the calcined product to 150° C. or lower to obtain a cooled product, and a step of pulverizing the cooled product such that a BET specific surface area becomes 0.90 to 1.55 $m^2/g$, in which, in the step of obtaining the cooled product, an average cooling rate in a temperature range from 600° C. to 150° C. is 150 to 3500° C./h.

[2] The method for producing the lithium metal composite oxide according to [1], in which the lithium metal composite oxide is represented by a composition formula (I).

$$Li[Li_x(Ni_{(1-y-z)}Co_yX_z)_{1-x}]O_2 \qquad (I)$$

(In the formula (I), X represents one or more elements selected from the group consisting of Mn, Cu, Ti, Mg, Al, W, B, Mo, Nb, Zn, Sn, Zr, Ga, and V, and $-0.1\leq x\leq0.2$, $0\leq y\leq0.5$, $0\leq z\leq0.8$, and $y+z<1$ are satisfied.)

[3] The method for producing the lithium metal composite oxide according to [1] or [2], in which the step of obtaining the calcined product and the step of obtaining the cooled product are performed in an oxygen-containing atmosphere.

[4] The method for producing the lithium metal composite oxide according to [3], in which an oxygen concentration in the oxygen-containing atmosphere in the step of obtaining the cooled product is higher than an oxygen concentration in the oxygen-containing atmosphere in the step of obtaining the calcined product.

[5] The method for producing the lithium metal composite oxide according to any one of [1] to [4], in which an average cooling rate in a temperature range from 600° C. to 400° C. in the step of obtaining the cooled product is 150 to 10000° C./h, and an average cooling rate in a temperature range from 400° C. to 150° C. is 10 to 3500° C./h.

[6] The method for producing the lithium metal composite oxide according to any one of [1] to [5], in which the step of obtaining the calcined product is performed using a rotary kiln, and the step of obtaining the cooled product is performed using one of a rotary cooler and a fluidized-bed cooler.

[7] The method for producing the lithium metal composite oxide according to [6], in which the step of obtaining the cooled product is performed using the rotary cooler, and a ratio of a volume of a rotary cylinder of the rotary cooler to a volume of a rotary cylinder of the rotary kiln is 0.05 or more and 2 or less.

[8] The method for producing the lithium metal composite oxide according to [7], in which a rotation speed of the rotary cooler in the step of obtaining the cooled product is 0.4 to 130 m/min.

[9] The method for producing the lithium metal composite oxide according to any one of [1] to [8], in which the step of pulverizing the cooled product is performed using a disc mill or a pin mill.

The method for producing the lithium metal composite oxide according to [9], in which, in the step of pulverizing the cooled product, the disc mill is operated such that a rotation speed becomes 120 to 12000 rpm, and the cooled product is pulverized.

[11] The method for producing the lithium metal composite oxide according to [9], in which, in the step of pulverizing the cooled product, the pin mill is operated such that a rotation speed becomes 300 rpm or more and less than 20000 rpm, and the cooled product is pulverized.

[12] The method for producing the lithium metal composite oxide according to any one of [1] to [5] and [9] to [11], in which the step of obtaining the cooled product is performed by at least one of (a) a method in which heating means of a calcining device is turned off or a set temperature of the calcining device is decreased to be lower than the temperature during calcining after the calcining and the calcined product is left to stand in the calcining device for a predetermined time such that an average cooling rate becomes in the above-described range and (b) a method in which the calcined product discharged from the calcining device is left to stand at 20° C. or higher and 30° C. or lower and cooled by gradually lowering the temperature or blowing an air to the calcined product such that an average cooling rate becomes in the above-described range.

Advantageous Effects of Invention

According to the present invention, it is possible to provide a method for producing a lithium metal composite oxide enabling the obtainment of lithium secondary batteries having improved initial characteristics, output characteristics and charge characteristics when used as a positive electrode active material for a lithium secondary battery.

DESCRIPTION OF EMBODIMENTS

Figure 1:
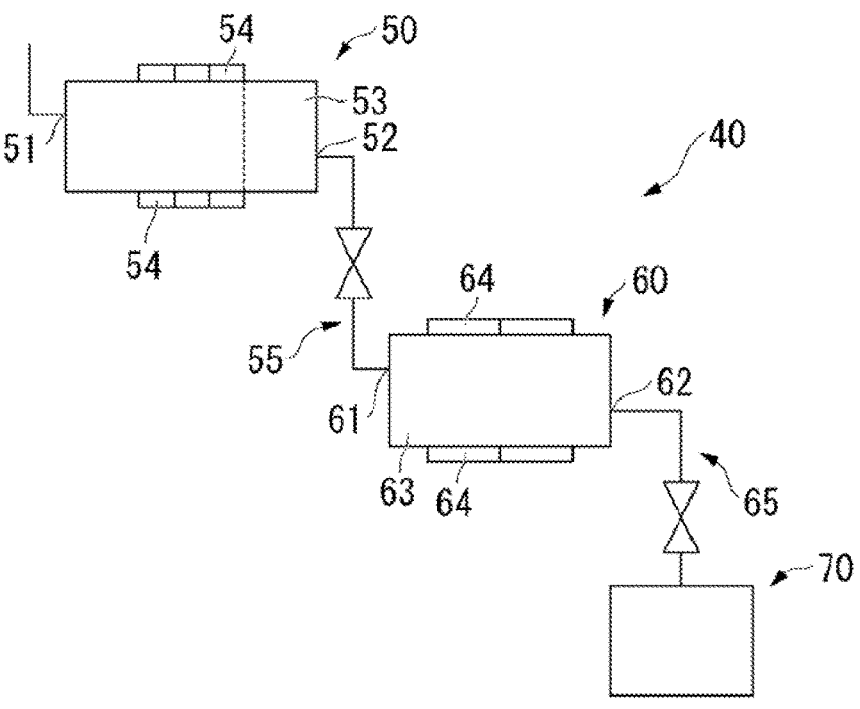
FIG. 1 is a schematic view for describing a method for producing a lithium metal composite oxide in one aspect of the present embodiment.

Hereinafter, a method for producing a lithium metal composite oxide according to one aspect of the present invention will be described. In a plurality of embodiments to be described below, preferable examples or conditions may be shared.

In the present specification, a metal composite compound will be hereinafter referred to as "MCC", a lithium metal composite oxide will be hereinafter referred to as "LiMO", and a positive electrode (cathode) active material for a lithium secondary battery will be hereinafter referred to as "CAM".

"Ni" refers not to a nickel metal but to a nickel atom, and "Co", "Mn", "Li", and the like also, similarly, each refer to a cobalt atom, a manganese atom, a lithium atom, or the like.

In a case where a numerical range is expressed as, for example, "1 to 10 μm" or "1 to 10 μm", this means a range from 1 μm to 10 μm and means a numerical range including 1 μm, which is the lower limit value, and 10 μm, which is the upper limit value.

The "BET specific surface area" is a value that is measured by the Brunauer, Emmet, and Teller (BET) method. Nitrogen gas is used as the adsorbed gas in the measurement of the BET specific surface area. For example, the BET specific surface area (unit: $m^2/g$) can be measured using a BET specific surface area meter (for example, Macsorb (registered trademark) manufactured by Mountech Co., Ltd.) after drying 1 g of a powder to be measured in a nitrogen atmosphere at 105° C. for 30 minutes.

"Having improved initial characteristics" means that the value of the initial efficiency measured by the following method is 87.0% or more.

The initial efficiency of a lithium secondary battery is calculated by the following method.

<Measurement of Initial Efficiency>

The lithium secondary battery is left to stand at room temperature for 12 hours to sufficiently impregnate the separator and the positive electrode mixture layer with an electrolytic solution.

Next, at a testing temperature of 25° C., the set current value is set to 0.2 CA for both charging and discharging, and each of constant-current constant-voltage charging and constant-current discharging is performed. The maximum charge voltage is set to 4.3V, and the minimum discharge voltage is set to 2.5V. The charge capacity is measured, and the obtained value is defined as the "initial charge capacity" (mAh/g). Furthermore, the discharge capacity is measured, and the obtained value is defined as the "initial discharge capacity" (mAh/g).

In addition, the initial efficiency is calculated by the following formula using the value of the initial discharge capacity and the value of the initial charge capacity.

Initial efficiency (%)=initial discharge capacity (mAh/g)/initial charge capacity (mAh/g)×100

"Having improved output characteristics" means that the value of the discharge capacity at 10 C measured by the following method is 11.5 mAh/g or more.

The discharge capacity at 10 C of the lithium secondary battery is calculated by the following method.

<Measurement of Discharge Capacity at 10 C>

At a testing temperature of 25° C., the set current value is set to 0.2 CA, the maximum charge voltage is set to 4.3 V, and constant-current constant-voltage charging is performed. Then, the set current value is set to 10 CA, the minimum discharge voltage is set to 2.5 V, constant current discharging is performed to measure the discharge capacity, and the obtained value is defined as the "discharge capacity at 10 C" (mAh/g).

"Having improved charge characteristics" means that the rate of the charge capacity at 0.5 CA is 99.95% or more in a case where the charge capacity at 0.2 CA measured by the following method is regarded as 100%.

The charge capacities of the lithium secondary battery at 0.2 CA and 0.5 CA are calculated by the following method.

<Charging Rate Test>

At a testing temperature of 25° C., the set current value is set to 0.2 CA, the maximum charge voltage is set to 4.3 V, and constant-current constant-voltage charging is performed. Then, the set current value is set to 0.2 CA, the minimum discharge voltage is set to 2.5 V, and constant current discharging is performed. Furthermore, the set current value is set to 0.2 CA, the maximum charge voltage is set to 4.3 V, constant-current constant-voltage charging is performed to measure the charge capacity, and the obtained value is defined as the "charge capacity at 0.2 C" (mAh/g).

After that, the set current value is set to 0.2 CA, the minimum discharge voltage is set to 2.5 V, and constant current discharging is performed. In addition, the set current value is set to 0.5 CA, the maximum charge voltage is set to 4.3 V, constant-current constant-voltage charging is performed to measure the charge capacity, and the obtained value is defined as the "charge capacity at 0.5 C" (mAh/g).

The 0.5 CA/0.2 CA charge capacity ratio obtained by the following formula is obtained using the charge capacity at 0.2 C and the charge capacity at 0.5 C and used as an index of charge characteristics.

(0.5 CA/0.2 CA charge capacity ratio)

0.5 CA/0.2 CA charge capacity ratio (%)

=charge capacity at 0.5 CA/charge capacity at 0.2 CA×100

<Method for Producing LiMO>

The method for producing LIMO of the present embodiment includes a step of calcining, at 600° C. or higher, one of a mixture of a lithium compound and MCC and a reactant obtained by preliminarily calcining the mixture to obtain a calcined product, a step of cooling the calcined product from a calcining temperature in the step of obtaining the calcined product to 150° C. or lower to obtain a cooled product, and a step of pulverizing the cooled product such that the BET specific surface area becomes 0.90 to 1.55 m²/g, and, in the step of obtaining the cooled product, the average cooling rate in a temperature range from 600° C. to 150° C. is 150 to 3500° C./h.

The mixture of MCC and the lithium compound is obtained by mixing MCC and the lithium compound without performing preliminary calcining or calcining, which will be described below. The reactant is obtained by preliminarily calcining MCC and the lithium compound as described below.

The method for producing LIMO of the present embodiment may include, before the step of obtaining the calcined product, a step of producing MCC and a step of mixing the lithium compound and MCC.

(1) Production of MCC

A method for producing MCC will be described below. MCC may be any of a metal composite hydroxide, a metal composite oxide, and a mixture thereof. The metal composite hydroxide and the metal composite oxide contain Ni, Co, and X in a mole ratio represented by the following formula (I').

$$Ni:Co:X=(1-y-z):y:z \qquad (I')$$

(In the formula (I'), X represents one or more elements selected from the group consisting of Mn, Cu, Ti, Mg, Al, W, B, Mo, Nb, Zn, Sn, Zr, Ga, and V, and $0 \le y \le 0.5$, $0 \le z \le 0.8$, and $y+z<1$ are satisfied.)

A method for producing MCC containing Ni, Co, and Al will be described below as an example. First, a metal composite hydroxide containing Ni, Co, and Al is prepared. Usually, the metal composite hydroxide can be produced by a well-known batch-type co-precipitation method or continuous co-precipitation method.

Specifically, a nickel salt solution, a cobalt salt solution, an aluminum salt solution, and a complexing agent are reacted by the continuous co-precipitation method described in Japanese Unexamined Patent Application, First Publication No. 2002-201028, thereby producing a metal composite hydroxide represented by $Ni_{(1-y-z)}Co_yAl_z(OH)_2$ (in the example of this production method, since it is assumed that Ni, Co, and Al are contained, in the formula, $0<y \le 0.5$ and $0<z \le 0.8$ are satisfied).

A nickel salt that is a solute of the nickel salt solution is not particularly limited, and, for example, at least one of nickel sulfate, nickel nitrate, nickel chloride, and nickel acetate can be used.

As a cobalt salt that is a solute of the cobalt salt solution, for example, at least one of cobalt sulfate, cobalt nitrate, cobalt chloride, and cobalt acetate can be used.

As an aluminum salt that is a solute of the aluminum salt solution, at least one of aluminum sulfate, aluminum nitrate, aluminum chloride, and aluminum acetate can be used.

The above-described metal salts are used in fractions corresponding to the composition ratio of $Ni_{(1-y-z)}Co_yAl_z$ $(OH)_2$. That is, the amount of each metal salt is specified so that the mole ratio of Ni, Co, and Al in a mixed solution containing the above-described metal salts corresponds to $(1-y-z):y:z$ in the composition formula (I) of LiMO. In addition, as the solvent, water is used.

The complexing agent is capable of forming a complex with a nickel ion, a cobalt ion, and an aluminum ion in an aqueous solution, and examples thereof include ammonium ion donors (ammonium hydroxide, ammonium sulfate, ammonium chloride, ammonium carbonate, ammonium fluoride, and the like), hydrazine, ethylenediaminetetraacetic acid, nitrilotriacetic acid, uracildiacetic acid, and glycine.

In the production step of the metal composite hydroxide, the complexing agent may or may not be used. In a case where the complexing agent is used, regarding the amount of the complexing agent that is contained in the liquid mixture containing the nickel salt solution, the cobalt salt solution, the aluminum salt solution, and the complexing agent, for example, the mole ratio of the complexing agent to the sum of the mole numbers of the metal salts (a nickel salt, a cobalt salt and an aluminum salt) is more than 0 and 2.0 or less.

In the co-precipitation method, in order to adjust the pH value of the liquid mixture containing the nickel salt solution, the cobalt salt solution, the aluminum salt solution, and the complexing agent, an alkali metal hydroxide is added to the liquid mixture before the pH of the liquid mixture turns from alkaline into neutral. The alkali metal hydroxide is, for example, sodium hydroxide or potassium hydroxide.

The value of pH in the present specification is defined as a value measured when the temperature of the liquid mixture is 40° C. The pH of the liquid mixture is measured when the temperature of the liquid mixture sampled from a reaction vessel reaches 40° C. In a case where the sampled liquid mixture is lower than 40° C., the liquid mixture is heated up to 40° C. and the pH is measured. In a case where the sampled liquid mixture exceeds 40° C., the pH of the liquid mixture cooled to 40° C. is measured.

When the complexing agent in addition to the nickel salt solution, the cobalt salt solution, and the aluminum salt solution is continuously supplied to the reaction vessel, Ni, Co, and Al react with one another, and $Ni_{(1-y-z)}Co_yAl_z(OH)_2$ is generated.

At the time of the reaction, the temperature of the reaction vessel is controlled within a range of, for example, 20° C. to 80° C. and preferably 30° C. to 70° C.

In addition, at the time of the reaction, the pH value in the reaction vessel is controlled, for example, within a range of pH 9 to 13.

A reaction precipitate formed in the reaction vessel is neutralized under stirring. The time for neutralization of the reaction precipitate is, for example, 1 to 20 hours.

As the reaction vessel that is used in the continuous co-precipitation method, it is possible to use a reaction vessel in which the formed reaction precipitate is caused to overflow for separation.

In a case where the metal composite hydroxide is produced by the batch-type co-precipitation method, examples of the reaction vessel include a reaction vessel not equipped with an overflow pipe, a device having a mechanism in which a condensation tank connected to the overflow pipe is provided and a reaction precipitate that has overflown is condensed in a condensation tank and circulated to the reaction vessel again and the like.

A variety of gases, for example, an inert gas such as nitrogen, argon, or carbon dioxide, an oxidizing gas such as an air or oxygen, or a gas mixture thereof may be supplied into the reaction vessel.

After the above-described reaction, the neutralized reaction precipitate is isolated. For isolation, for example, a method in which a slurry containing the reaction precipitate (that is, co-precipitate slurry) is dehydrated by centrifugation, suction filtration, or the like is used.

The isolated reaction precipitate is washed, dehydrated, dried, and sieved, and a metal composite hydroxide containing Ni, Co, and Al is obtained.

The reaction precipitate is preferably washed with water or an alkaline washing liquid. In the present embodiment, the reaction precipitate is preferably washed with an alkaline washing liquid and more preferably washed with a sodium hydroxide aqueous solution. In addition, the reaction precipitate may be washed using a washing liquid containing a sulfur element. As the washing liquid containing a sulfur element, a sulfate aqueous solution of potassium or sodium or the like is an exemplary example.

In a case where MCC is a metal composite oxide, the metal composite oxide is produced by heating the metal composite hydroxide. Specifically, the metal composite hydroxide is heated at 400° C. to 700° C. If necessary, a plurality of heating steps may be performed. The heating temperature in the present specification means the set temperature of a heating device. In the case of having a plurality of heating steps, the heating temperature means the temperature when the metal composite hydroxide is heated at the highest holding temperature among individual heating steps.

The heating temperature is preferably 400° C. to 700° C. and more preferably 450° C. to 680° C. When the heating temperature is 400° C. to 700° C., the metal composite hydroxide is sufficiently oxidized, and a metal composite hydroxide having a BET specific surface area within an appropriate range is obtained. When the heating temperature is lower than 400° C., there is a concern that the metal composite hydroxide may not be sufficiently oxidized. When the heating temperature exceeds 700° C., there is a concern that the metal composite hydroxide may be excessively oxidized and the BET specific surface area of the metal composite oxide may become too small.

The time during which the metal composite hydroxide is held at the heating temperature is, for example, 0.1 to 20 hours and preferably 0.5 to 10 hours. The temperature rising rate up to the heating temperature is, for example, 50 to 400° C./hour, and the temperature decrease rate from the heating temperature to room temperature is, for example, 10 to 400° C./hour. In addition, as the heating atmosphere, it is possible to use the atmosphere, oxygen, nitrogen, argon or a gas mixture thereof.

The inside of the heating device may have an appropriate oxygen-containing atmosphere. The oxygen-containing atmosphere may be a gas mixture atmosphere of an inert gas and an oxidizing gas or may be a state in which an oxidizing agent is present in an inert gas atmosphere. When the inside of the heating device is an appropriate oxygen-containing atmosphere, a transition metal that is contained in the metal composite hydroxide is appropriately oxidized, which makes it easy to control the form of the metal composite oxide.

As oxygen or the oxidizing agent in the oxygen-containing atmosphere, a sufficient number of oxygen atoms need to be present in order to oxidize the transition metal.

In a case where the oxygen-containing atmosphere is a gas mixture atmosphere of an inert gas and an oxidizing gas, the atmosphere in the heating device can be controlled by a method such as the aeration of an oxidizing gas into the heating device or the bubbling of an oxidizing gas in the liquid mixture.

As the oxidizing agent, it is possible to use a peroxide such as hydrogen peroxide, a peroxide salt such as permanganate, perchloric acid, hypochlorous acid, nitric acid, halogen, ozone, or the like.

MCC can be produced by the above steps.

(2) Mixing of MCC and Lithium Compound

The present step is a step of mixing a lithium compound and MCC to obtain a mixture.

First, the MCC is dried and then mixed with the lithium compound. After the drying of MCC, classification may be appropriately performed.

As the lithium compound that is used in the present embodiment, it is possible to use at least any one of lithium carbonate, lithium nitrate, lithium acetate, lithium hydroxide, lithium oxide, lithium chloride, and lithium fluoride. Among these, any one of lithium hydroxide and lithium carbonate or a mixture thereof is preferable. In addition, in a case where lithium hydroxide contains lithium carbonate, the content of lithium carbonate in lithium hydroxide is preferably 5 mass % or less.

The lithium compound and MCC are mixed in consideration of the composition ratio of a final target product to obtain a mixture. Specifically, the lithium compound and MCC are mixed at proportions corresponding to the composition ratio of the composition formula (I). The amount of lithium atoms to the total amount 1 of metal atoms that are included in MCC (mole ratio) is preferably 1.05 or more and more preferably 1.10 or more. A calcined product is obtained by calcining the mixture of the lithium compound and MCC as described below.

The reactant of MCC and the lithium compound is obtained by preliminarily calcining the mixture of MCC and the lithium compound.

In the present embodiment, preliminary calcining refers to calcining at a temperature lower than the calcining temperature in a calcining step to be described below. The calcining temperature during the preliminary calcining is, for example, in a range of 400° C. or higher and lower than 700° C. The preliminary calcining may be performed a plurality of times.

A calcining device used for the preliminary calcining is not particularly limited, and the preliminary calcining may be performed using, for example, any of a continuous calcining furnace or a fluidized calcining furnace. As the fluidized calcining furnace, a rotary kiln or a fluidized-bed calcining furnace may be used.

FIG. 1 is a schematic view for describing an example of a production device used in the method for producing LIMO in one aspect of the present embodiment. A production device 40 shown in FIG. 1 has a calcining device 50, a cooling device 60, and a pulverizing device 70. In the production device 40 shown in FIG. 1, a "step of obtaining a calcined product", a "step of obtaining a cooled product", and a "step of pulverizing the cooled product", which will be described below, can be performed continuously.

(3) Calcining of Mixture or Reactant

The present step is a step of calcining, at 600° C. or higher, one of the mixture of the lithium compound and MCC obtained in the above-described mixing step and a reactant obtained by preliminarily calcining the mixture to obtain a calcined product (hereinafter, referred to as the calcining step in some cases).

(Calcining Device)

A fluidized calcining furnace is used as the calcining device 50 used for the calcining of one of the mixture of MCC and the lithium compound and the reactant obtained by preliminarily calcining the mixture. In the fluidized calcining furnace, a substance to be calcined (in the present embodiment, one of the mixture of MCC and the lithium compound and the reactant obtained by preliminarily calcining the mixture) is not put into a sheath box or the like, but the substance to be calcined itself is injected into the calcining furnace. Therefore, the calcining rate and the cooling rate can be controlled without being affected by the material or the like of the sheath box.

As the fluidized calcining furnace, a rotary kiln or a fluidized-bed calcining furnace can be used. As the fluidized calcining furnace, a rotary kiln is preferably used. In the following description, a rotary kiln is used as the calcining device 50, and the calcining device 50 will be referred to as the "rotary kiln 50" in the description.

In FIG. 1, the rotary kiln 50 is a device that heats a substance to be treated in a rotary cylinder 53 having a supply port 51 of the substance to be treated at one end and a discharge port 52 of the substance to be treated at the other end. That is, the rotary cylinder 53 is a calcining furnace, and the substance to be treated is calcined in the rotary cylinder 53.

The rotary cylinder 53 is cylindrical and rotatable around an axis thereof. The inner wall of the rotary cylinder 53 is preferably an alloy containing nickel, iron, chromium, and the like.

The volume of the rotary cylinder 53 is, for example, 1 to 100 m³, preferably 2 to 99 m³, and more preferably 3 to 98 m³.

The rotary kiln 50 is connected to the cooling device 60 through a pipe 55 including a valve. The calcined mixture of MCC and the lithium compound, that is, the calcined product, is supplied from the discharge port 52 to the cooling device 60 through the pipe 55.

Heating means 54 is provided in the rotary cylinder 53. A plurality of the heating means 54 may be provided.

As the calcining atmosphere in the rotary cylinder 53, the atmosphere, oxygen, nitrogen, argon, a gas mixture thereof, or the like is used depending on a desired composition. In the present embodiment, the calcining atmosphere is preferably an oxygen-containing atmosphere. In a case where the calcining atmosphere is an oxygen-containing atmosphere, the oxygen concentration in the calcining atmosphere is preferably 21 to 100 vol % and more preferably 25 to 100 vol %.

The calcining step preferably has a plurality of calcining stages that is performed at different calcining temperatures. For example, a first calcining stage and a second calcining stage of calcining the mixture or the reactant at a higher temperature than in the first calcining stage are each preferably independently performed. Furthermore, the calcining step may have a calcining stage that is performed at a different calcining temperature for a different calcining time.

The calcining temperature in the present embodiment is 600° C. or higher, preferably 600° C. to 1100° C., more preferably 610° C. to 1050° C., particularly preferably 610° C. to 800° C., and particularly preferably 610° C. to 750° C. When the calcining temperature is 600° C. or higher, it is possible to obtain LIMO having a strong crystal structure. In addition, when the calcining temperature is 1100° C. or lower, it is possible to reduce the volatilization of lithium on the surfaces of secondary particles contained in LiMO.

The calcining temperature in the present specification means the temperature of the atmosphere in the calcining furnace and is the highest temperature of temperatures held in the calcining step (hereinafter, referred to as the highest holding temperature). In the case of the calcining step having a plurality of heating steps, the calcining temperature means the temperature when the mixture or the reactant is heated at the highest holding temperature among the individual heating steps. The upper limit value and lower limit value of the calcining temperature can be randomly combined together.

The holding time in the calcining is preferably 3 to 50 hours. When the holding time in the calcining exceeds 50 hours, there is a tendency that the battery performance substantially deteriorates due to the volatilization of lithium. When the holding time in the calcining is shorter than 3 hours, the development of crystals is poor, and there is a tendency that the battery performance becomes poor. It is also effective to perform preliminary calcining before the above-described calcining. The temperature of the preliminary calcining is within a range of 300° C. to 850° C., and the preliminary calcining is preferably performed for 1 to 10 hours.

In the present specification, the holding time in the calcining is defined as the time taken for the mixture of MCC and the lithium compound to be supplied from the supply port 51 and reach the end of a region where the heating means 54 is provided.

The rotation speed of the rotary cylinder 53 in the calcining step is preferably 0.1 to 80 m/min. When the rotation speed of the rotary cylinder 53 is 0.2 to 70 m/min, the mixture of MCC and the lithium compound is likely to be calcined uniformly.

One of the mixture of MCC and the lithium compound and the reactant obtained by preliminarily calcining the mixture may be calcined in the presence of an inert melting agent. The inert melting agent may remain in the calcined product or may be removed by being washed with a washing liquid after the calcining. In the present embodiment, the calcined product is preferably washed with pure water, an alkaline washing liquid, or the like. As the alkaline washing liquid, the above-described alkaline washing liquid can be used.

The inert melting agent that can be used in the present embodiment is not particularly limited as long as the inert melting agent does not easily react with the mixture during the calcining. In the present embodiment, one or more selected from the group consisting of a fluoride of one or more elements selected from the group consisting of Na, K, Rb, Cs, Ca, Mg, Sr, and Ba (hereinafter, referred to as "M"), a chloride of M, a carbonate of M, a sulfate of M, a nitrate of M, a phosphate of M, a hydroxide of M, a molybdate of M, and a tungstate of M are exemplary examples.

In a case where the mixture is calcined in the presence of the inert melting agent, the calcining temperature may be set in consideration of the melting point of the inert melting agent, which will be described below, and is preferably set in a range of [melting point of inert melting agent−200° C.] or higher and [melting point of inert melting agent+200° C.] or lower.

As the fluoride of M, NaF (melting point: 993° C.), KF (melting point: 858° C.), RbF (melting point: 795° C.), CsF (melting point: 682° C.), $CaF_2$ (melting point: 1402° C.), $MgF_2$ (melting point: 1263° C.), $SrF_2$ (melting point: 1473° C.), and $BaF_2$ (melting point: 1355° C.) can be exemplary examples.

As the chloride of M, NaCl (melting point: 801° C.), KCl (melting point: 770° C.), RbCl (melting point: 718° C.), CsCl (melting point: 645° C.), $CaCl_2$ (melting point: 782° C.), $MgCl_2$ (melting point: 714° C.), $SrCl_2$ (melting point: 857° C.), and $BaCl_2$ (melting point: 963° C.) can be exemplary examples.

As the carbonate of M, $Na_2CO_3$ (melting point: 854° C.), $K_2CO_3$ (melting point: 899° C.), $Rb_2CO_3$ (melting point: 837° C.), $Cs_2CO_3$ (melting point: 793° C.), $CaCO_3$ (melting point: 825° C.), $MgCO_3$ (melting point: 990° C.), $SrCO_3$ (melting point: 1497° C.), and $BaCO_3$ (melting point: 1380° C.) can be exemplary examples.

As the sulfate of M, $Na_2SO_4$ (melting point: 884° C.), $K_2SO_4$ (melting point: 1069° C.), $Rb_2SO_4$ (melting point: 1066° C.), $Cs_2SO_4$ (melting point: 1005° C.), $CaSO_4$ (melting point: 1460° C.), $MgSO_4$ (melting point: 1137° C.), $SrSO_4$ (melting point: 1605° C.), and $BaSO_4$ (melting point: 1580° C.) can b exemplary examples.

Examples of the nitrate of M, $NaNO_3$ (melting point: 310° C.), $KNO_3$ (melting point: 337° C.), $RbNO_3$ (melting point: 316° C.), $CsNO_3$ (melting point: 417° C.), $Ca(NO_3)_2$ (melting point: 561° C.), $Mg(NO_3)_2$, $Sr(NO_3)_2$ (melting point: 645° C.), and $Ba(NO_3)_2$ (melting point: 596° C.) can be exemplary examples.

As the phosphate of M, $Na_3PO_4$, $K_3PO_4$ (melting point: 1340° C.), $Rb_3PO_4$, $Cs_3PO_4$, $Ca_3(PO_4)_2$, $Mg_3(PO_4)_2$, (melting point: 1184° C.), $Sr_3(PO_4)_2$ (melting point: 1727° C.), and $Ba_3(PO_4)_2$ (melting point: 1767° C.) can be exemplary examples.

As the hydroxide of M, NaOH (melting point: 318° C.), KOH (melting point: 360° C.), RbOH (melting point: 301° C.), CsOH (melting point: 272° C.), $Ca(OH)_2$ (melting point: 408° C.), $Mg(OH)_2$ (melting point: 350° C.), $Sr(OH)_2$ (melting point: 375° C.), and $Ba(OH)_2$ (melting point: 853° C.) can be exemplary examples.

As the molybdate of M, $Na_2MoO_4$ (melting point: 698° C.), $K_2MoO_4$ (melting point: 919° C.), $Rb_2MoO_4$ (melting point: 958° C.), $Cs_2MoO_4$ (melting point: 956° C.), $CaMoO_4$ (melting point: 1520° C.), $MgMoO_4$ (melting point: 1060°

C.), $SrMoO_4$ (melting point: 1040° C.), and $BaMoO_4$ (melting point: 1460° C.) can be exemplary examples.

As the tungstate of M, $Na_2WO_4$ (melting point: 687° C.), $K_2WO_4$, $Rb_2WO_4$, $Cs_2WO_4$, $CaWO_4$, $MgWO_4$, $SrWO_4$, and $BaWO_4$ can be exemplary examples.

In the present embodiment, it is also possible to use two or more kinds of inert melting agents described above. In the case of using two or more kinds of inert melting agents, there is also a case where the melting point decreases. In addition, among these inert melting agents, as an inert melting agent for obtaining LiMO having higher crystallinity, any of the carbonate of M, the sulfate of M, and the chloride of M or a combination thereof is preferable. In addition, M is preferably any one or both of sodium (Na) and potassium (K). That is, among the above-described inert melting agents, a particularly preferable inert melting agent is one or more selected from the group consisting of NaOH, KOH, NaCl, KCl, $Na_2CO_3$, $K_2CO_3$, $Na_2SO_4$, and $K_2SO_4$.

In the present embodiment, $K_2CO_3$ or $K_2SO_4$ is preferable as the inert melting agent.

The amount of the inert melting agent used during the calcining may be appropriately adjusted. Regarding the amount of the inert melting agent used during the calcining, the amount of the inert melting agent to the total amount of the lithium compound and the inert melting agent is preferably 0.010 to 30 mol %, more preferably 0.015 to 20 mol %, and still more preferably 0.020 to 15 mol %.

A calcined product is obtained by calcining one of the mixture of MCC and the lithium compound and the reactant obtained by preliminarily calcining the mixture as described above.

(4) Cooling of Calcined Product

The present step is a step of cooling the calcined product obtained in the above-described calcining step to obtain a cooled product (hereinafter, referred to as the cooling step in some cases).

(Cooling Device)

In the present embodiment, as the cooling device 60, a fluidized cooling device is used. In the fluidized cooling device, the substance to be treated (the calcined product in the present embodiment) is injected into the cooling device without being put into a sheath box or the like. Therefore, the cooling rate can be controlled without being affected by the material or the like of the sheath box.

As the fluidized cooling device 60, a rotary cooler, a fluidized-bed cooler, or the like can be used. As the cooling device 60, a rotary cooler is preferable. In the following description, a rotary cooler is used as the cooling device 60, and the cooling device 60 will be referred to as the "rotary cooler 60".

The rotary cooler 60 shown in FIG. 1 is a device that cools a substance to be treated in a rotary cylinder 63 having a supply port 61 of the substance to be treated on one end and a discharge port 62 of the substance to be treated on the other end. The substance to be treated, that is, the calcined product, is supplied from the rotary kiln 50 to the rotary cylinder 63 through the supply port 61 and cooled in the rotary cylinder 63.

The rotary cylinder 63 is cylindrical and rotatable around an axis thereof. The inner wall of the rotary cylinder 63 is preferably an alloy containing nickel, iron, chromium, and the like.

The volume of the rotary cylinder 63 is, for example, 0.5 to 60 m³, preferably 0.51 to 59 m³, and more preferably 0.52 to 58 m³.

The ratio of the volume of the rotary cylinder 63 of the rotary cooler to the volume of the rotary cylinder 53 of the rotary kiln is preferably 0.05 to 2 and more preferably 0.06 to 1.9. When the ratio of the volume of the rotary cylinder 63 of the rotary cooler to the volume of the rotary cylinder 53 of the rotary kiln is 0.05 to 2, it is easy to control the average cooling rate in a temperature range from 600° C. to 150° C. to 150 to 2500° C./h.

The rotary cooler 60 is connected to the pulverizing device 70 through a pipe 65 including a valve. The cooled product cooled with the rotary cooler 60 is supplied to the pulverizing device 70 from the discharge port 62 through the pipe 65.

Cooling means 64 is provided in the rotary cylinder 63. As the cooling means 64, water cooling-type cooling means, air cooling-type cooling means, and the like are exemplary examples.

The rotation speed of the rotary cylinder 63 in the cooling step is preferably 0.4 to 130 m/min. When the rotation speed of the rotary cylinder 63 is 0.5 to 129 m/min, the substance to be treated is likely to be cooled uniformly.

The cooled product obtained by being cooled with the rotary cylinder 63 is supplied to the pulverizing device 70 from the discharge port 62 through the pipe 65.

The cooling of the calcined product in the present specification is performed in a region from the end of the region where the heating means of the calcining furnace is provided to the front of the pulverizing device. That is, the cooling of the calcined product is performed while the calcined product reaches the end of the region where the heating means of the calcining furnace is provided and then reaches before the pulverizing device. The cooling of the calcined product is performed while the temperature of the calcined product becomes 150° C. or lower from the calcining temperature in the above-described calcining step. In a case where the above-described calcining step has a plurality of calcining stages, the "calcining temperature in the above-described calcining step" refers to the calcining temperature in the calcining stage that is performed immediately before the cooling step (that is, the final calcining stage in the calcining step).

In the present embodiment, the cooling region is from the end of the heating means 54 of the rotary cylinder 53 to before the pulverizing device 70, that is, the end of the pipe 65. The average cooling rate in a temperature range from 600° C. to 150° C. in the cooling step is 150 to 3500° C./h, preferably 160 to 2490° C./h, and more preferably 170 to 2480° C./h. When the average cooling rate in the temperature range from 600° C. to 150° C. in the cooling step is 150 to 3500° C./h, in LiMO, the ratio $(I_1/I_2)$ of peak areas obtained by measurement by powder XRD becomes high, and the initial characteristics, output characteristics, and charge characteristics of lithium batteries for which this LiMO is used as a positive electrode active material become high.

The average cooling rate in the temperature range from 600° C. to 150° C. in the cooling step means the average value of the cooling rates during an elapsed time while the calcined product reaches 600° C. and then reaches 150° C.

In more detail, the cooling region can be divided into a first cooling region from the end of the heating means 54 of the rotary cylinder 53 to the end of the pipe 55, a second cooling region from the supply port 61 to the discharge port 62 of the rotary cylinder 63, and a third cooling region from the tip to the end of the pipe 65.

In the first cooling region, that is, while the calcined product reaches the end of the heating means 54 of the rotary cylinder 53 and then reaches the end of the pipe 55, the calcined product is cooled from the calcining temperature in the calcining step to about 400° C. At this time, the average cooling rate in a temperature range from 600° C. to 400° C. is 150 to 10000° C./h, preferably 160 to 9990° C./h, and more preferably 170 to 9980° C./h.

In the second cooling region, that is, while the calcined product is supplied from the supply port 61 of the rotary cylinder 63 and discharged from the discharge port 62, the calcined product that has passed through the first cooling region is cooled from about 400° C. to about 150° C. The average cooling rate in a temperature range from 400° C. to 150° C. is preferably 10 to 3500° C./h and more preferably 20 to 3490° C./h. In the third cooling region, that is, while the calcined product reaches the tip of the pipe 65 and then reaches the end of the pipe 65, the calcined product that has passed through the second cooling region is cooled to 150° C. or lower.

As the cooling atmosphere in the rotary cylinder 63, the atmosphere, oxygen, nitrogen, argon, a gas mixture thereof, or the like is used. In the present embodiment, the cooling atmosphere is preferably an oxygen-containing atmosphere. In a case when the cooling atmosphere is an oxygen-containing atmosphere, the oxygen concentration in the cooling atmosphere is preferably higher than the oxygen concentration in the calcining step. Specifically, the oxygen concentration in the cooling atmosphere is preferably 21 to 100 vol % and more preferably 25 to 100 vol %.

When the average cooling rate in the temperature range from 600° C. to 400° C. in the cooling step is 150 to 10000° C./h, and the average cooling rate in the temperature range from 400° C. to 150° C. is 10 to 3500° C./h as described above, the $I_1/I_2$ of LiMO becomes higher, and the initial characteristics, output characteristics, and charge characteristics of lithium batteries for which this LiMO is used as a positive electrode active material become superior.

An example of using the cooling device in the cooling step has been described, but the cooling step is not limited to this as long as the average cooling rate in the temperature range from 600° C. to 150° C. in the cooling step is 150 to 3500° C./h. For example, cooling during which no cooling devices are used in the cooling step and the average cooling rate of the calcined product is controlled to be in the above-described range is also included in the present invention. Examples thereof include (a) a method in which heating means of the calcining device is turned off or the set temperature of the calcining device is decreased to be lower than the temperature during the calcining after the calcining and the calcined product is left to stand in the calcining device for a predetermined time such that an average cooling rate is in the above-described range, (b) a method in which the calcined product discharged from the calcining device is left to stand at room temperature (for example, 20° C. or higher and 30° C. or lower) and cooled by gradually lowering the temperature or blowing an air to the calcined product such that the average cooling rate is in the above-described range, and the like. These methods may be combined together. In a case where the cooling is performed by the above-described method (a), the cooling of the calcined product refers to a process where the set temperature of the heating means of the calcining device begins to be lowered and the calcined product reaches before the pulverizing device, and, in a case where the cooling is performed by the above-described method (b), the cooling of the calcined product refers to a process where the calcined product is discharged from the calcining furnace and then reaches before the pulverizing device. The method (a) and the method (b) may be performed in combination.

(5) Pulverizing of Cooled Product

The present step is a step of pulverizing the calcined product cooled as described above, that is, the cooled product (hereinafter, referred to as the pulverizing step in some cases). The temperature of the cooled product in the pulverizing step is not particularly limited as long as the temperature is 150° C. or lower and may be room temperature (for example, 20° C. to 30° C.).

A disc mill or a pin mill can be used as the pulverizing device 70. A disc mill is preferable as the pulverizing device 70.

The pulverizing of the cooled product is preferably performed such that the rotation speed of the disc mill becomes 120 to 12000 rpm, preferably 130 to 11000 rpm, or the rotation speed of the pin mill becomes 300 to 20000 rpm. The pulverizing time can be appropriately set so that the BET specific surface area of LIMO is within a range to be described below and is preferably, for example, 1 second or longer and 2 hours or shorter.

In the present embodiment, the cooled product has a BET specific surface area of less than 0.90 $m^2/g$. The cooled product is pulverized so that the BET specific surface area of the cooled product becomes 0.90 to 1.55 $m^2/g$. The BET specific surface area of pulverized LiMO is preferably 0.91 to 1.54 $m^2/g$ and more preferably 0.92 to 1.53 $m^2/g$. When the cooled product is pulverized so that the BET specific surface area becomes 0.90 to 1.55 $m^2/g$ or less, the initial characteristics, output characteristics, and charge characteristics of lithium batteries for which LiMO to be obtained is used as a positive electrode active material improve.

The pulverizing may be performed on a small scale using a manual pulverizing tool such as a mortar. In a case when the pulverizing is performed with a mortar, the process immediately before the beginning of the pulverizing is defined as the cooling step.

LiMO is obtained by pulverizing the cooled product as described above.

In the present embodiment, an example in which the "calcining step", the "cooling step", and the "pulverizing step" are continuously performed has been described, but the present invention is not limited thereto. The "calcining step", the "cooling step", and the "pulverizing step" may be each performed separately or may be discontinuous. For example, the "calcining step" and the "cooling step" may be performed continuously, and the "pulverizing step" may be performed separately, not continuously. At this time, the cooling step refers to the process where the calcined product is discharged from the calcining device and is then soon about to be injected into the pulverizing device.

(6) Other Steps

The inert melting agent remaining on LIMO obtained by pulverizing may be washed. For the washing, pure water or an alkaline washing liquid can be used. As the alkaline washing liquid, for example, aqueous solutions of one or more anhydrides selected from the group consisting of lithium hydroxide, sodium hydroxide, potassium hydroxide, lithium carbonate, sodium carbonate, potassium carbonate, and ammonium carbonate and a hydrate thereof can be exemplary examples. In addition, as an alkali, it is also possible to use ammonia.

The temperature of the washing liquid that is used for the washing is preferably 15° C. or lower, more preferably 10° C. or lower, and still more preferably 8° C. or lower. When the temperature of the washing liquid is controlled within the above-described range to an extent that the washing liquid does not freeze, it is possible to suppress the excessive elution of lithium ions from the crystal structure of LiMO into the washing liquid during the washing.

As a method for bringing the washing liquid and LiMO into contact with each other in the washing, a method in which LiMO is injected into an aqueous solution of each washing liquid and stirred is an exemplary example. In addition, a method in which an aqueous solution of each washing liquid is sprayed to LiMO as a shower water may also be used. Furthermore, a method in which LiMO is injected into an aqueous solution of the washing liquid and stirred, then, LiMO is separated from the aqueous solution of each washing liquid, and then the aqueous solution of each washing liquid is sprayed to the separated LiMO as a shower water may also be used.

In the washing, it is preferable to bring the washing liquid and LiMO into contact with each other for an appropriate range of time. "Appropriate time" in the washing refers to a time long enough to disperse each particle of LiMO while removing the inert melting agent remaining on the surface of LiMO. The washing time is preferably adjusted depending on the aggregation state of LiMO. The washing time is particularly preferably, for example, in a range of 5 minutes or longer and 1 hour or shorter.

In the present embodiment, after the washing of LiMO, it is preferable to further perform a heat treatment on LiMO. The temperature or method for performing the heat treatment on LiMO is not particularly limited, but is preferably 300° C. or higher, more preferably 350° C. or higher, and still more preferably 400° C. or higher since it is possible to prevent a decrease in the charge capacity. In addition, while not particularly limited, the temperature is preferably 1000° C. or lower and more preferably 950° C. or lower since the volatilization of lithium can be prevented and LiMO having the composition of the present embodiment can be obtained.

The amount of lithium volatilized can be controlled by the heat treatment temperature.

The upper limit value and lower limit value of the heat treatment temperature can be randomly combined together. For example, the heat treatment temperature is preferably 300 to 1000° C., more preferably 350 to 950° C., and still more preferably 400 to 950° C.

As the atmosphere during the heat treatment, an oxygen atmosphere, an inert atmosphere, a reduced pressure atmosphere, or a vacuum atmosphere is an exemplary example. When the heat treatment after the washing is performed in the above-described atmosphere, a reaction between LiMO and moisture or carbon dioxide in the atmosphere during the heat treatment is suppressed, and LiMO containing a few impurities can be obtained.

<LiMO>

LiMO produced by the above-described production method has the following properties.

LiMO is a metal oxide containing at least Li and Ni and is represented by, for example, a composition formula (I).

$$Li[Li_x(Ni_{(1-y-z)}Co_yX_z)_{1-x}]O_2 \qquad (I)$$

In the formula (I), X represents one or more elements selected from the group consisting of Mn, Cu, Ti, Mg, Al, W, B, Mo, Nb, Zn, Sn, Zr, Ga, and V, and $-0.1 \leq x \leq 0.2$, $0 \leq y \leq 0.5$, $0 \leq z \leq 0.8$, and $y+z<1$ are satisfied.

From the viewpoint of obtaining a lithium secondary battery having a high cycle retention rate, x in the composition formula (I) is −0.1 or more, more preferably −0.05 or more, and still more preferably more than 0. In addition, from the viewpoint of obtaining a lithium secondary battery having a higher initial coulombic efficiency, x in the composition formula (I) is 0.2 or less, preferably 0.08 or less, and more preferably 0.06 or less.

The upper limit value and lower limit value of x can be randomly combined together. As the combination, for example, x's of −0.1 to 0.2, more than 0 and 0.2 or less, −0.05 to 0.08, more than 0 and 0.06 or less, and the like are exemplary examples.

From the viewpoint of obtaining a lithium secondary battery having a low battery internal resistance, y in the formula (I) is more than 0, preferably 0.005 or more, more preferably 0.01 or more, and still more preferably 0.05 or more. y in the formula (I) is 0.5 or less, preferably 0.35 or less, more preferably 0.33 or less, and still more preferably 0.30 or less.

The upper limit value and lower limit value of y can be randomly combined together. y is more than 0 and 0.5 or less, more preferably 0.005 to 0.35, still more preferably 0.01 to 0.33, and particularly preferably 0.05 to 0.30.

From the viewpoint of obtaining a lithium secondary battery having a high cycle retention rate, z in the formula (I) is 0 or more, preferably 0.01 or more, more preferably 0.02 or more, and still more preferably 0.1 or more. In addition, z in the formula (I) is 0.8 or less, preferably 0.7 or less, more preferably 0.6 or less, and still more preferably 0.55 or less.

The upper limit value and lower limit value of z can be randomly combined together. z is 0 to 0.8, preferably 0.01 to 0.7, more preferably 0.02 to 0.6, and still more preferably 0.1 to 0.55.

From the viewpoint of improving cycle characteristics, y+z is more than 0, preferably 0.01 or more, and more preferably 0.02 or more. From the viewpoint of obtaining a lithium secondary battery having high thermal stability, y+z is 0.9 or less, preferably 0.5 or less, and more preferably 0.3 or less.

The upper limit value and lower limit value of y+z can be randomly combined together. y+z is preferably more than 0 to 0.9, more preferably 0.01 to 0.5, and still more preferably 0.05 to 0.3.

From the viewpoint of obtaining a lithium secondary battery having a high cycle retention rate, X is preferably one or more metals selected from the group consisting of Mn, Ti, Mg, Al, W, B, and Zr and more preferably one or more metals selected from the group consisting of Mn, Al, W, B, and Zr.

The composition of LIMO can be analyzed, for example, using an inductively coupled plasma emission spectrometer (for example, SPS3000 manufactured by Seiko Instruments Inc.) after LiMO is dissolved in hydrochloric acid.

The BET specific surface area of LIMO of the present embodiment is 0.90 to 1.55 $m^2/g$. The BET specific surface area is preferably 0.91 to 1.54 $m^2/g$ and more preferably 0.92 to 1.53 $m^2/g$. When the BET specific surface area of LiMO is 0.90 to 1.55 $m^2/g$, the initial characteristics, output characteristics, and charge characteristics of lithium batteries for which LiMO to be obtained is used as a positive electrode active material improve.

The $I_1/I_2$ of LiMO of the present embodiment is preferably 1.53 to 3.50, more preferably 1.53 to 3.30, and still more preferably 1.53 to 3.20. As described above, when the BET specific surface area is within a predetermined range and the $I_1/I_2$ is 1.53 to 3.50, the initial characteristics, output characteristics, and charge characteristics of lithium batteries for which this LiMO is used as a positive electrode active material improve.

The $I_1/I_2$ can be calculated by performing powder X-ray diffraction measurement of a LiMO powder where CuKα is used as a radiation source and the measurement range of the diffraction angle 2θ is set to 10° to 90°. Specifically, powder X-ray diffraction measurement of LIMO is performed using an X-ray diffractometer (for example, Ultima IV manufactured by Rigaku Corporation), and the corresponding diffraction peaks are analyzed with analysis software (for example, integrated powder X-ray analysis software JADE), whereby the $I_1/I_2$ can be obtained. $I_1$ is the peak area within a range of 2θ=44.4±1°. $I_2$ is the peak area within a range of 2θ=64.5±1°.

In the present embodiment, the crystal structure of LiMO is a layered structure and more preferably a hexagonal crystal structure or a monoclinic crystal structure.

The hexagonal crystal structure belongs to any one space group selected from the group consisting of P3, $P3_1$, $P3_2$, R3, P-3, R-3, P312, P321, $P3_112$, $P3_121$, $P3_212$, $P3_221$, R32, P3m1, P31m, P3c1, P31c, R3m, R3c, P-31m, P-31c, P-3m1, P-3c1, R-3m, R-3c, P6, $P6_1$, $P6_5$, $P6_2$, $P6_4$, $P6_3$, P-6, P6/m, $P6_3$/m, P622, $P6_122$, $P6_522$, $P6_222$, $P6_422$, $P6_322$, P6mm, P6cc, $P6_3$cm, $P6_3$mc, P-6m2, P-6c2, P-62m, P-62c, P6/mmm, P6/mcc, $P6_3$/mcm, and $P6_3$/mmc.

In addition, the monoclinic crystal structure belongs to any one space group selected from the group consisting of P2, $P2_1$, C2, Pm, Pc, Cm, Cc, P2/m, $P2_1$/m, C2/m, P2/c, $P2_1$/c, and C2/c.

Among these, in order to obtain a lithium secondary battery having a high discharge capacity, the crystal structure is particularly preferably a hexagonal crystal structure belonging to the space group R-3m or a monoclinic crystal structure belonging to C2/m.

<CAM>

CAM of the present embodiment contains LiMO produced by the above-described method. In CAM of the present embodiment, the content proportion of LiMO in the total mass (100 mass %) of CAM is preferably 70 mass % or more and 99 mass % or less and more preferably 80 mass % or more and 98 mass % or less.

In the present embodiment, the content proportion of LiMO in the total mass of CAM is observed by irradiating CAM with an electron beam at an acceleration voltage of 20 kV using SEM (for example, JSM-5510 manufactured by JEOL Ltd.). The magnification of a SEM photograph is adjusted to a magnification at which 200 to 400 CAM particles, which are the subject, are present in the SEM photograph. As an example, the magnification may be 1000 to 30000 times.

<Lithium Secondary Battery>

Next, the configuration of a lithium secondary battery that is suitable in a case where LiMO of the present embodiment is used as a positive electrode active material will be described.

Furthermore, a positive electrode for a lithium secondary battery that is suitable in a case where LiMO of the present embodiment is used as a positive electrode active material (hereinafter, referred to as the positive electrode in some cases) will be described.

Furthermore, a lithium secondary battery that is suitable for an application of a positive electrode will be described.

An example of the lithium secondary battery that is suitable in a case where LIMO of the present embodiment is used as a positive electrode active material has a positive electrode, a negative electrode, a separator interposed between the positive electrode and the negative electrode, and an electrolytic solution disposed between the positive electrode and the negative electrode.

An example of the lithium secondary battery has a positive electrode, a negative electrode, a separator interposed between the positive electrode and the negative electrode, and an electrolytic solution disposed between the positive electrode and the negative electrode.

Figure 2:
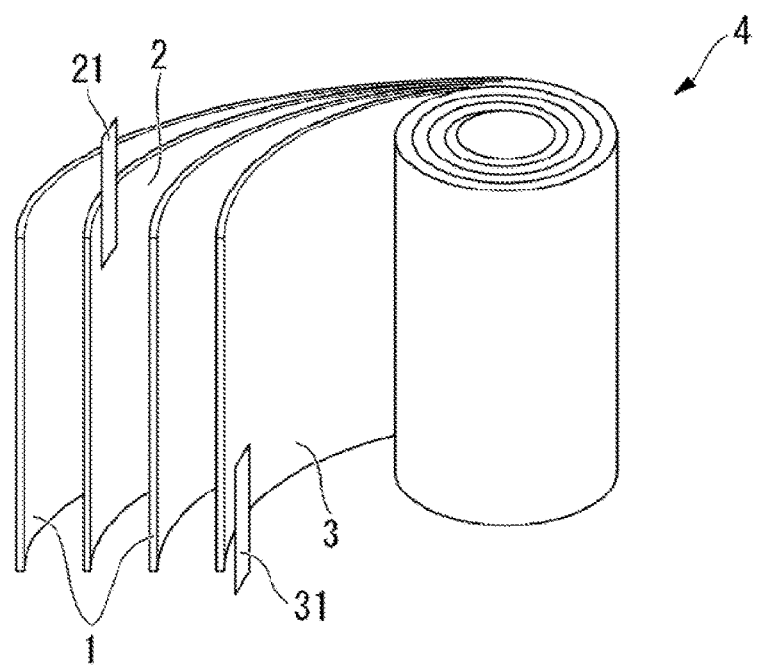
FIG. 2 is a schematic configuration view showing one example of a lithium secondary battery.
Figure 3:
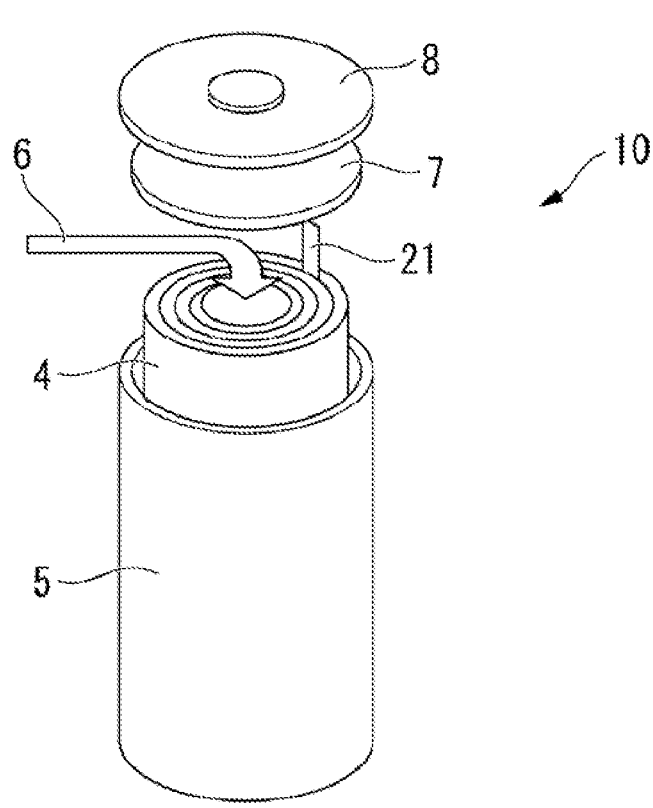
FIG. 3 is a schematic configuration view showing the example of the lithium secondary battery.

FIG. 2 and FIG. 3 are schematic views showing an example of the lithium secondary battery. A cylindrical lithium secondary battery 10 of the present embodiment is produced as described below.

First, as shown in FIG. 2, a pair of separators 1 having a strip shape, a strip-shaped positive electrode 2 having a positive electrode lead 21 at one end, and a strip-shaped negative electrode 3 having a negative electrode lead 31 at one end are laminated in order of the separator 1, the positive electrode 2, the separator 1, and the negative electrode 3 and are wound to form an electrode group 4.

Next, as shown in FIG. 3, the electrode group 4 and an insulator, not shown, are accommodated in a battery can 5, and then the can bottom is sealed. The electrode group 4 is impregnated with an electrolytic solution 6, and an electrolyte is disposed between the positive electrode 2 and the negative electrode 3. Furthermore, the upper portion of the battery can 5 is sealed with a top insulator 7 and a sealing body 8, whereby the lithium secondary battery 10 can be produced.

As the shape of the electrode group 4, for example, a columnar shape in which the cross-sectional shape becomes a circle, an ellipse, a rectangle, or a rectangle with rounded corners when the electrode group 4 is cut in a direction perpendicular to the winding axis is an exemplary example.

In addition, as the shape of a lithium secondary battery having such an electrode group 4, a shape that is specified by IEC60086, which is a standard for batteries specified by the International Electrotechnical Commission (IEC) or by JIS C 8500 can be adopted. For example, shapes such as a cylindrical shape and a square shape can be exemplary examples.

Furthermore, the lithium secondary battery is not limited to the winding-type configuration and may have a laminate-type configuration in which the laminated structure of the positive electrode, the separator, the negative electrode, and the separator is repeatedly overlaid. As the laminate-type lithium secondary battery, a so-called coin-type battery, button-type battery, or paper-type (or sheet-type) battery can be an exemplary example.

Hereinafter, each configuration will be described in order.
(Positive Electrode)

The positive electrode can be produced by, first, preparing a positive electrode mixture containing a positive electrode active material, a conductive material, and a binder and supporting the positive electrode mixture by a positive electrode current collector.
(Conductive Material)

As the conductive material in the positive electrode, a carbon material can be used. As the carbon material, graphite powder, carbon black (for example, acetylene black), a fibrous carbon material, and the like can be exemplary examples.

The proportion of the conductive material to the positive electrode mixture is preferably 5 parts by mass or more and 20 parts by mass or less with respect to 100 parts by mass of the positive electrode active material. In the case of using a fibrous carbon material such as a graphitized carbon fiber or a carbon nanotube as the conductive material, it is also possible to decrease the proportion thereof.

(Binder)

As the binder in the positive electrode, a thermoplastic resin can be used. As the thermoplastic resin, polyimide resins; fluoro resins such as polyvinylidene fluoride (hereinafter, referred to as PVdF in some cases) and polytetrafluoroethylene; polyolefin resins such as polyethylene and polypropylene, and the resins described in WO 2019/098384A1 or US2020/0274158A1 can be exemplary examples.

Two or more of these thermoplastic resins may be used in a mixture form. When a fluororesin and a polyolefin resin are used as the binder, the proportion of the fluororesin to the entire positive electrode mixture is set to 1 mass % or more and 10 mass % or less, and the proportion of the polyolefin resin is set to 0.1 mass % or more and 2 mass % or less, whereby it is possible to obtain a positive electrode mixture having both a high adhesive force to the positive electrode current collector and a high bonding force inside the positive electrode mixture.
(Positive Electrode Current Collector)

As the positive electrode current collector in the positive electrode, a strip-shaped member formed of a metal material such as Al, Ni, or stainless steel as a forming material can be used. Particularly, a positive electrode current collector that is formed of Al and has a thin film shape is preferable since the positive electrode current collector is easy to process and inexpensive.

As the method for supporting the positive electrode mixture by the positive electrode current collector, a method in which the positive electrode mixture is formed by pressurization on the positive electrode current collector is an exemplary example. In addition, the positive electrode mixture may be supported by the positive electrode current collector by preparing a paste of the positive electrode mixture using an organic solvent, applying and drying the paste of the positive electrode mixture to be obtained on at least one surface side of the positive electrode current collector, and fixing the positive electrode mixture by pressing.

As the organic solvent that can be used in the case of preparing the paste of the positive electrode mixture, an amine-based solvent such as N,N-dimethylaminopropylamine or diethylenetriamine; an ether-based solvent such as tetrahydrofuran; a ketone-based solvent such as methyl ethyl ketone; an ester-based solvent such as methyl acetate; and an amide-based solvent such as dimethylacetamide or N-methyl-2-pyrrolidone (hereinafter, referred to as NMP in some cases) are exemplary examples.

As the method for applying the paste of the positive electrode mixture to the positive electrode current collector, a slit die coating method, a screen coating method, a curtain coating method, a knife coating method, a gravure coating method, and an electrostatic spraying method are exemplary examples.

The positive electrode can be produced by the method exemplified above.
(Negative Electrode)

The negative electrode in the lithium secondary battery needs to be a material which can be doped with lithium ions and from which lithium ions can be de-doped at a potential lower than that of the positive electrode, and an electrode in which a negative electrode mixture containing a negative electrode active material is supported by a negative electrode current collector and an electrode formed of a negative electrode active material alone are exemplary examples.

(Negative Electrode Active Material)

As the negative electrode active material in the negative electrode, materials which are a carbon material, a chalcogen compound (oxide, sulfide, or the like), a nitride, a metal, or an alloy and which can be doped with lithium ions and from which lithium ions can be de-doped at a potential lower than that of the positive electrode are exemplary examples.

As the carbon material that can be used as the negative electrode active material, graphite such as natural graphite or artificial graphite, cokes, carbon black, pyrolytic carbons, a carbon fiber, and a calcined product of an organic polymer-fired compound body can be exemplary examples.

As oxides that can be used as the negative electrode active material, oxides of silicon represented by a formula $SiO_x$ (here, x is a positive real number) such as $SiO_2$ and SiO and metal composite oxides containing lithium and titanium or vanadium such as $Li_4Ti_5O_{12}$ and $LiVO_2$ can be exemplary examples.

In addition, as the metal that can be used as the negative electrode active material, lithium metal, silicon metal, tin metal, and the like can be exemplary examples.

As a material that can be used as the negative electrode active material, the materials described in WO 2019/098384A1 or US2020/0274158A1 may be used.

These metals and alloys can be used as an electrode, mainly, singly after being processed into, for example, a foil shape.

Among the above-described negative electrode active materials, the carbon material containing graphite such as natural graphite or artificial graphite as a main component is preferably used for the reason that the potential of the negative electrode rarely changes (the potential flatness is favorable) from an uncharged state to a fully-charged state during charging, the average discharging potential is low, the capacity retention rate at the time of repeatedly charging and discharging the lithium secondary battery is high (the cycle characteristics are favorable), and the like. The shape of the carbon material may be, for example, any of a flaky shape such as natural graphite, a spherical shape such as mesocarbon microbeads, a fibrous shape such as a graphitized carbon fiber, or an aggregate of fine powder.

The negative electrode mixture may contain a binder as necessary. As the binder, thermoplastic resins can be exemplary examples, and specifically, PVdF, thermoplastic polyimide, carboxymethylcellulose (hereinafter, referred to as CMC in some cases), styrene-butadiene rubber (hereinafter, referred to as SBR in some cases), polyethylene, and polypropylene can be exemplary examples.

(Negative Electrode Current Collector)

As the negative electrode current collector in the negative electrode, a strip-shaped member formed of a metal material such as Cu, Ni, or stainless steel as the forming material can be an exemplary example. Particularly, a negative electrode current collector that is formed of Cu and has a thin film shape is preferable since the negative electrode current collector does not easily produce an alloy with lithium and is easy to process.

As a method for supporting the negative electrode mixture by the negative electrode current collector, similar to the case of the positive electrode, a method in which the negative electrode mixture is formed by pressurization and a method in which a paste of the negative electrode mixture is prepared using a solvent or the like, applied and dried on the negative electrode current collector, and then the negative electrode mixture is compressed by pressing are exemplary examples.

(Separator)

As the separator in the lithium secondary battery, it is possible to use, for example, a material that is made of a material such as a polyolefin resin such as polyethylene or polypropylene, a fluororesin, or a nitrogen-containing aromatic polymer and has a form such as a porous film, a non-woven fabric, or a woven fabric. In addition, the separator may be formed using two or more of these materials or the separator may be formed by laminating these materials. In addition, the separators described in JP-A-2000-030686 or US20090111025A1 may be used.

In the present embodiment, the air resistance of the separator by the Gurley method specified by JIS P 8117 is preferably 50 sec/100 cc or more and 300 sec/100 cc or less and more preferably 50 sec/100 cc or more and 200 sec/100 cc or less in order to favorably permeate the electrolyte while the battery is in use (while the battery is being charged and discharged).

In addition, the porosity of the separator is preferably 30 vol % or more and 80 vol % or less and more preferably 40 vol % or more and 70 vol % or less with respect to the total volume of the separator. The separator may be a laminate of separators having different porosities.

(Electrolytic Solution)

The electrolytic solution in the lithium secondary battery contains an electrolyte and an organic solvent.

As the electrolyte that is contained in the electrolytic solution, lithium salts such as $LiClO_4$ and $LiPF_6$ are exemplary examples, and a mixture of two or more thereof may be used. In addition, the electrolytes described in WO 2019/098384A1 or US2020/0274158A1 may be used. Among these, as the electrolyte, at least one selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$, which contain fluorine, is preferably used.

As the organic solvent that is contained in the electrolytic solution, for example, propylene carbonate, ethylene carbonate, dimethyl carbonate, diethyl carbonate, ethyl methyl carbonate, and the organic solvents described in WO 2019/098384A1 or US2020/0274158A1 can be used.

As the organic solvent, two or more of these are preferably mixed and used, and a solvent mixture of a cyclic carbonate and a non-cyclic carbonate and a solvent mixture of a cyclic carbonate and ethers are more preferable. As the solvent mixture of a cyclic carbonate and a non-cyclic carbonate, a solvent mixture containing ethylene carbonate, dimethyl carbonate, and ethyl methyl carbonate is preferable.

In addition, as the electrolytic solution, it is preferable to use an electrolytic solution containing a lithium salt containing fluorine such as $LiPF_6$ and an organic solvent having a fluorine substituent since the safety of lithium secondary batteries to be obtained is enhanced.

<All-Solid-State Lithium Secondary Battery>

Next, a positive electrode for which LiMO according to an aspect of the present invention is used as a positive electrode active material for an all-solid-state lithium secondary battery and an all-solid-state lithium secondary battery having this positive electrode will be described while describing the configuration of the all-solid-state lithium secondary battery.

Figure 4:
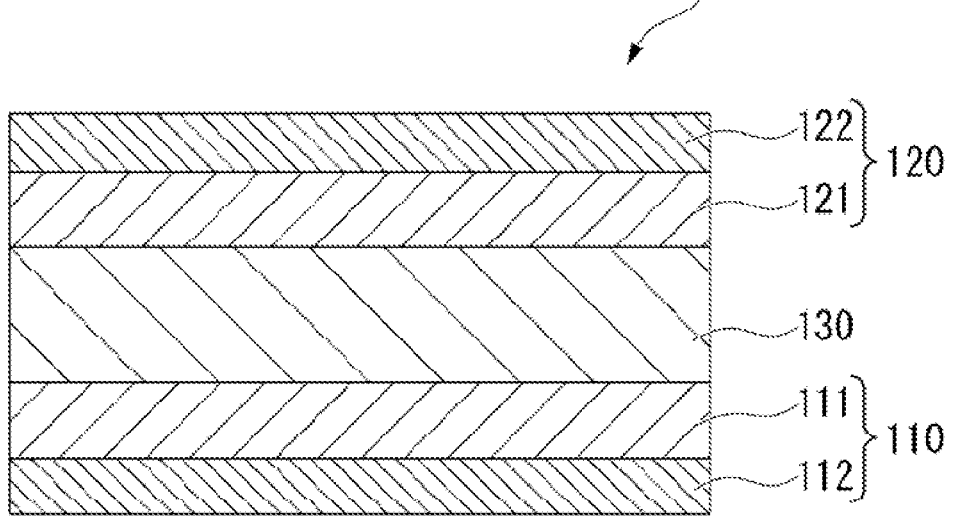
FIG. 4 is a schematic view showing a laminate that an all-solid-state lithium secondary battery of the present embodiment includes.
Figure 5:
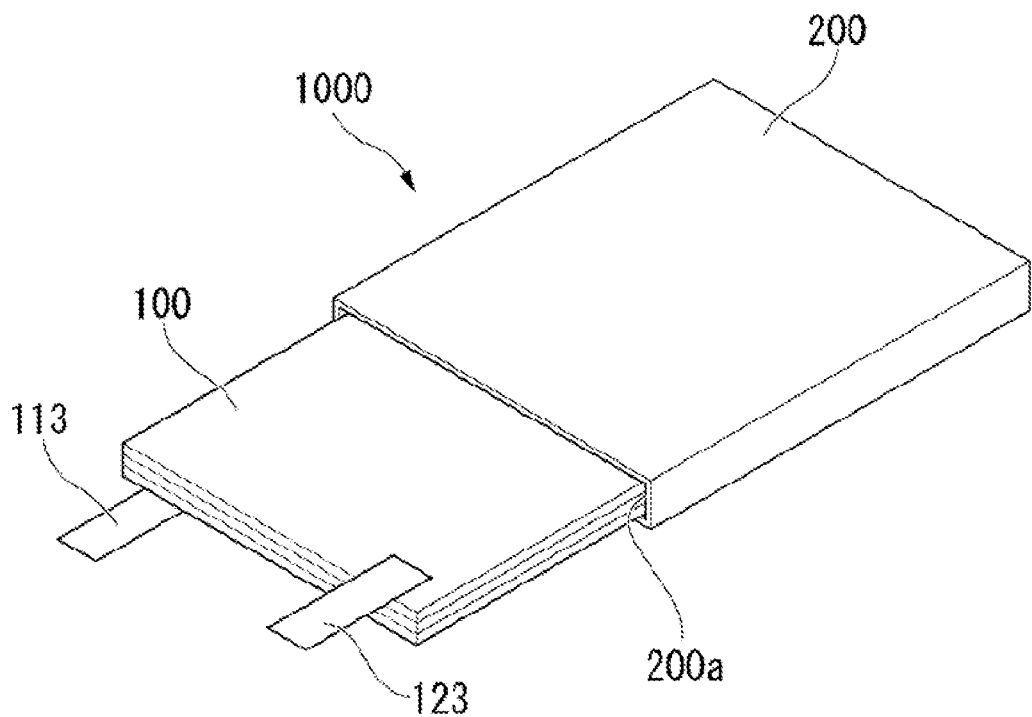
FIG. 5 is a schematic view showing the overall configuration of the all-solid-state lithium secondary battery of the present embodiment.

FIG. 4 and FIG. 5 are schematic views showing an example of an all-solid-state lithium secondary battery of the present embodiment. An all-solid-state lithium secondary battery 1000 shown in FIG. 4 and FIG. 5 has a laminate 100 having a positive electrode 110, a negative electrode 120, and a solid electrolyte layer 130 and an exterior body 200 accommodating the laminate 100. In addition, the all-solid-state lithium secondary battery 1000 may have a bipolar structure in which a positive electrode active material and a negative electrode active material are disposed on both sides of a current collector. As specific examples of the bipolar structure, for example, the structures described in JP-A-2004-95400 are exemplary examples. A material that configures each member will be described below.

The laminate 100 may have an external terminal 113 that is connected to a positive electrode current collector 112 and an external terminal 123 that is connected to a negative electrode current collector 122. In addition, the all-solid-state lithium secondary battery 1000 may have a separator between the positive electrode 110 and the negative electrode 120.

The all-solid-state lithium secondary battery 1000 further has an insulator, not shown, that insulates the laminate 100 and the exterior body 200 from each other and a sealant, not shown, that seals an opening portion 200a of the exterior body 200.

As the exterior body 200, a container formed of a highly corrosion-resistant metal material such as aluminum, stainless steel or nickel-plated steel can be used. In addition, as the exterior body 200, a container obtained by processing a laminate film having at least one surface on which a corrosion resistant process has been performed into a bag shape can also be used.

As the shape of the all-solid-state lithium secondary battery 1000, for example, shapes such as a coin type, a button type, a paper type (or a sheet type), a cylindrical type, a square type, and a laminate type (pouch type) can be exemplary examples.

As an example of the all-solid-state lithium secondary battery 1000, a form in which one laminate 100 is provided is shown in the drawings, but the present embodiment is not limited thereto. The all-solid-state lithium secondary battery 1000 may have a configuration in which the laminate 100 is used as a unit cell and a plurality of unit cells (laminates 100) is sealed inside the exterior body 200.

Hereinafter, each configuration will be described in order.
(Positive Electrode)

The positive electrode 110 of the present embodiment has a positive electrode active material layer 111 and a positive electrode current collector 112.

The positive electrode active material layer 111 contains LiMO, which is one aspect of the present invention described above, and a solid electrolyte. In addition, the positive electrode active material layer 111 may contain a conductive material and a binder.
(Solid Electrolyte)

As the solid electrolyte that is contained in the positive electrode active material layer 111 of the present embodiment, a solid electrolyte that has lithium ion conductivity and used in well-known all-solid-state lithium secondary batteries can be adopted. As the solid electrolyte, an inorganic electrolyte and an organic electrolyte can be exemplary examples. As the inorganic electrolyte, an oxide-based solid electrolyte, a sulfide-based solid electrolyte, and a hydride-based solid electrolyte can be exemplary examples. As the organic electrolyte, polymer-based solid electrolytes are exemplary examples.
(Oxide-Based Solid Electrolyte)

As the oxide-based solid electrolyte, for example, a perovskite-type oxides, a NASICON-type oxide, a LISICON-type oxide, a garnet-type oxides, and the like are exemplary examples. As each electrolyte, the compounds described in WO 20201208872A1, US2016/0233510A1, US2012/0251871A1, and US2018/0159169A1 are exemplary examples, and examples thereof include the following compounds.

As the garnet-type oxide, Li—La—Zr-based oxides such as $Li_7La_3Zr_2O_{12}$ (also referred to as LLZ) are exemplary examples.

The oxide-based solid electrolyte may be a crystalline material or an amorphous material.
(Sulfide-Based Solid Electrolyte)

As the sulfide-based solid electrolyte, $Li_2S$—$P_2S_5$-based compounds, $Li_2S$—$SiS_2$-based compounds, $Li_2S$—$GeS_2$-based compounds, $Li_2S$—$B_2S_3$-based compounds, LiI—$Si_2S$—$P_2S_5$, LiI—$Li_2S$—$P_2O_5$-based compounds, LiI—$Li_3PO_4$-$P_2S_5$-based compounds, $Li_{10}GeP_2Si_2$, and the like can be exemplary examples.

In the present specification, the expression "-based compound" that indicates the sulfide-based solid electrolyte is used as a general term for solid electrolytes mainly containing a raw material written before "-based compound" such as "$Li_2S$" or "$P_2S_5$". For example, the $Li_2S$—$P_2S_5$-based compounds include solid electrolytes mainly containing $Li_2S$ and $P_2S_5$ and further containing a different raw material. The proportion of $Li_2S$ that is contained in the $Li_2S$—$P_2S_5$-based compound is, for example, 50 to 90 mass % with respect to the entire $Li_2S$—$P_2S_5$-based compound. The proportion of $P_2S_5$ that is contained in the $Li_2S$—$P_2S_5$-based compound is, for example, 10 to 50 mass % with respect to the entire $Li_2S$—$P_2S_5$-based compound. In addition, the proportion of the different raw material that is contained in the $Li_2S$—$P_2S_5$-based compound is, for example, 0 to 30 mass % with respect to the entire $Li_2S$—$P_2S_5$-based compound. In addition, the $Li_2S$—$P_2S_5$-based compounds also include solid electrolytes containing $Li_2S$ and $P_2S_5$ in different mixing ratios.

As the $Li_2S$—$P_2S_5$-based compounds, $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—LiI—LiBr, and the like can be exemplary examples.

As the $Li_2S$—$SiS_2$-based compounds, $Li_2S$—$SiS_2$, $Li_2S$—$SiS_2$-LiI, $Li_2S$—$SiS_2$-LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$SiS_2$—$P_2S_5$—LiCl, and the like are exemplary examples.

As the $Li_2S$—$GeS_2$-based compounds, $Li_2S$—$GeS_2$, $Li_2S$—$GeS_2$-$P_2S_5$, and the like are exemplary examples.

The sulfide-based solid electrolyte may be a crystalline material or an amorphous material.

Two or more solid electrolytes can be jointly used as long as the effect of the invention is not impaired.
(Conductive Material)

As the conductive material that the positive electrode active material layer 111 of the present embodiment has, the materials described in the above-described (conductive material) can be used. In addition, as for the proportion of the conductive material in the positive electrode mixture, the proportions described in the above-described (conductive material) can be applied in the same manner. In addition, as the binder that the positive electrode has, the materials described in the above-described (binder) can be used.
(Positive Electrode Current Collector)

As the positive electrode current collector 112 that the positive electrode 110 of the present embodiment has, the materials described in the above-described (positive electrode current collector) can be used.

As a method for supporting the positive electrode active material layer 111 by the positive electrode current collector 112, a method in which the positive electrode active material layer 111 is formed by pressurization on the positive electrode current collector 112 is an exemplary example. A cold press or a hot press can be used for the pressurization.

In addition, the positive electrode active material layer 111 may be supported by the positive electrode current collector 112 by preparing a paste of a mixture of the positive electrode active material, the solid electrolyte, the conductive material, and the binder using an organic solvent to produce a positive electrode mixture, applying and drying the positive electrode mixture to be obtained on at least one surface of the positive electrode current collector 112, and fixing the positive electrode mixture by pressing.

In addition, the positive electrode active material layer 111 may be supported by the positive electrode current collector 112 by preparing a paste of a mixture of the positive electrode active material, the solid electrolyte, and the conductive material using an organic solvent to produce a positive electrode mixture, applying and drying the positive electrode mixture to be obtained on at least one surface of the positive electrode current collector 112, and calcining the positive electrode mixture.

As the organic solvent that can be used for the positive electrode mixture, the same organic solvent as the organic solvent that can be used in the case of preparing the paste of the positive electrode mixture described in the above-described (positive electrode current collector) can be used.

As a method for applying the positive electrode mixture to the positive electrode current collector 112, for example, a slit die coating method, a screen coating method, a curtain coating method, a knife coating method, a gravure coating method, and an electrostatic spraying method are exemplary examples.

The positive electrode 110 can be produced by the method exemplified above.

(Negative Electrode)

The negative electrode 120 has a negative electrode active material layer 121 and the negative electrode current collector 122. The negative electrode active material layer 121 contains a negative electrode active material. In addition, the negative electrode active material layer 121 may contain a solid electrolyte and a conductive material. As the negative electrode active material, the negative electrode current collector, the solid electrolyte, the conductive material, and a binder, those described above can be used.

(Solid Electrolyte Layer)

The solid electrolyte layer 130 has the above-described solid electrolyte.

The solid electrolyte layer 130 can be formed by depositing a solid electrolyte of an inorganic substance on the surface of the positive electrode active material layer 111 in the above-described positive electrode 110 by a sputtering method.

In addition, the solid electrolyte layer 130 can be formed by applying and drying a paste-form mixture containing a solid electrolyte on the surface of the positive electrode active material layer 111 in the above-described positive electrode 110. The solid electrolyte layer 130 may be formed by pressing the dried paste-form mixture and further pressurizing the paste-form mixture by a cold isostatic pressure method (CIP).

The laminate 100 can be produced by laminating the negative electrode 120 on the solid electrolyte layer 130 provided on the positive electrode 110 as described above using a well-known method such that the negative electrode active material layer 121 comes into contact with the surface of the solid electrolyte layer 130.

In the lithium secondary battery having the above-described configuration, since LIMO that is produced by the above-described present embodiment is used in the positive electrode active material, it is possible to improve the initial characteristics, output characteristics, and charge characteristics of lithium secondary batteries for which this positive electrode active material is used.

In addition, since positive electrodes having the above-described configuration have CAM having the above-described configuration, it is possible to improve the initial characteristics, output characteristics, and charge characteristics of lithium secondary batteries.

Furthermore, the lithium secondary battery having the above-described configuration has the above-described positive electrode and thus becomes a secondary battery having improved initial characteristics, output characteristics, and charge characteristics.

Another aspect of the present invention includes the following aspects.

[13] A method for producing a lithium metal composite oxide including a step of calcining, at 600° C. or higher and 750° C. or lower, one of a mixture of a lithium compound and a metal composite compound containing at least Ni and a reactant obtained by preliminarily calcining the mixture to obtain a calcined product, a step of cooling the calcined product from a calcining temperature in the step of obtaining the calcined product to 150° C. or lower to obtain a cooled product, and a step of pulverizing the cooled product such that a BET specific surface area becomes 0.91 to 1.53 m²/g, in which, in the step of obtaining the cooled product, an average cooling rate in a temperature range from 600° C. to 150° C. is 170 to 3000° C./h.

[14] The method for producing the lithium metal composite oxide according to [13], in which the lithium metal composite oxide is represented by a composition formula (I).

$$Li[Li_x(Ni_{(1-y-z)}Co_yX_z)_{1-x}]O_2 \tag{I}$$

(In the formula (I), X represents one or more elements selected from the group consisting of Mn, Cu, Ti, Mg, Al, W, B, Mo, Nb, Zn, Sn, Zr, Ga, and V, and $0<x\leq0.06$, $0.01\leq y\leq0.30$, $0.01\leq z\leq0.40$, and $0.05\leq y+z\leq0.50$ are satisfied.)

[15] The method for producing the lithium metal composite oxide according to [13] or [14], in which the step of obtaining the calcined product and the step of obtaining the cooled product are performed in an oxygen-containing atmosphere.

[16] The method for producing the lithium metal composite oxide according to [15], in which an oxygen concentration in the oxygen-containing atmosphere in the step of obtaining the cooled product is higher than an oxygen concentration in the oxygen-containing atmosphere in the step of obtaining the calcined product.

[17] The method for producing the lithium metal composite oxide according to any one of [13] to [16], in which an average cooling rate in a temperature range from 600° C. to 400° C. in the step of obtaining the cooled product is 170 to 8000° C./h, and an average cooling rate in a temperature range from 400° C. to 150° C. is 80 to 3000° C./h.

[18] The method for producing the lithium metal composite oxide according to any one of [13] to [17], in which the step of obtaining the calcined product is performed using a rotary kiln, and the step of obtaining the cooled product is performed using one of a rotary cooler and a fluidized-bed cooler.

[19] The method for producing the lithium metal composite oxide according to [18], in which the step of obtaining the cooled product is performed using the rotary cooler, and a ratio of a volume of a rotary cylinder of the rotary cooler to a volume of a rotary cylinder of the rotary kiln is 0.05 or more and 2 or less.

[20] The method for producing the lithium metal composite oxide according to [19], in which a rotation speed of the rotary cooler in the step of obtaining the cooled product is 0.4 to 130 m/min.

[21] The method for producing the lithium metal composite oxide according to any one of [13] to [17], in which the step of obtaining the cooled product is performed by at least one of (a) a method in which heating means of a calcining device that has performed calcining is turned off or a set temperature of the calcining device is decreased to be lower than the temperature during calcining after the calcining and the calcined product is left to stand in the calcining device for a predetermined time such that an average cooling rate is in the above-described range, (b) a method in which the calcined product discharged from the calcining device is left to stand at 20° C. or higher and 30° C. or lower and cooled by gradually lowering the temperature or blowing an air to the calcined product such that an average cooling rate is in the above-described range, and (c) a method in which the calcined product is made to flow in a rotary cooler so that the average cooling rate is in the above-described range.

[22] The method for producing the lithium metal composite oxide according to any one of [13] to [21], in which the step of pulverizing the cooled product is performed using a disc mill or a pin mill.

[23] The method for producing the lithium metal composite oxide according to [22], in which, in the step of pulverizing the cooled product, the disc mill is operated such that a rotation speed becomes 120 to 12000 rpm, and the cooled product is pulverized.

[24] The method for producing the lithium metal composite oxide according to [22], in which, in the step of pulverizing the cooled product, the pin mill is operated such that a rotation speed becomes 300 rpm or more and less than 20000 rpm, and the cooled product is pulverized.

EXAMPLES

Hereinafter, the present invention will be described in detail by showing examples, but the present invention is not limited to the following description.

<Composition Analysis>

The composition analysis of LiMO that was produced by a method to be described below was performed by the above-described method using an inductively coupled plasma emission spectrometer (SPS 3000, manufactured by Seiko Instruments Inc.).

<Measurement of BET Specific Surface Area>

The BET specific surface area (unit: $m^2/g$) of LIMO was measured by the above-described method using a BET specific surface area meter (Macsorb (registered trademark) manufactured by Mountech Co., Ltd.).

<Measurement of $I_1/I_2$ $I_1/I_2$ was obtained by performing powder X-ray diffraction measurement of LiMO produced by a method to be described below using an X-ray diffractometer (Ultima IV manufactured by Rigaku Corporation) under the above-described measurement conditions and analyzing the corresponding diffraction peaks with analysis software (integrated powder X-ray analysis software JADE).

<Average Cooling Rate>

The temperature of a calcined product obtained by a method to be described below was continuously measured using a radiation thermometer (IR-304 manufactured by CUSTOM Corporation) from before cooling to the end of the cooling, and the time taken for the calcined product to reach 600° C. and then reach 150° C. was measured, and the average cooling rate was calculated.

<Production of Positive Electrode for Lithium Secondary Battery>

A paste-like positive electrode mixture was prepared by adding and kneading LiMO obtained by a production method to be described below, a conductive material (acetylene black), and a binder (PVdF) such that a composition of LiMO:conductive material:binder=92:5:3 (mass ratio) was achieved. During the preparation of the positive electrode mixture, N-methyl-2-pyrrolidone was used as an organic solvent.

The obtained positive electrode mixture was applied to an Al foil having a thickness of 40 μm, which was to serve as a current collector, and dried in a vacuum at 150° C. for 8 hours, thereby obtaining a lithium secondary battery positive electrode. The electrode area of the lithium secondary battery positive electrode was set to 1.65 $cm^2$.

<Production of Lithium Secondary Battery (Coin-Type Half Cell)>

The following operation was performed in a glove box under an argon atmosphere.

The above-described positive electrode for a lithium secondary battery was placed on the lower lid of a part of a coin cell for a coin type battery R2032 (manufactured by Hohsen Corp.) with the aluminum foil surface facing downward, and a laminated film separator (thickness 16 μm) having a heat-resistant porous layer laminated on a polyethylene porous film was placed on the positive electrode. An electrolytic solution (300 μl) was poured thereinto. As the electrolytic solution, a liquid prepared by dissolving $LiPF_6$ in a liquid mixture of ethylene carbonate, dimethyl carbonate, and ethyl methyl carbonate in a volume ratio of 30:35:35 to 1 mol/l was used.

Next, lithium metal was used as a negative electrode and placed on the upper side of the separator, and the upper lid was placed through a gasket and caulked using a caulking machine, thereby producing a lithium secondary battery (coin-type half cell R2032; hereinafter, referred to as "coin-type half cell" in some cases).

<Initial Efficiency, Discharge Capacity at 10 C, Charging Rate>

The condition tests described in the sections of <Measurement of initial efficiency>, <Measurement of discharge capacity at 10 C>, and <Charging rate test> were performed using the above-described coin-type half-cell.

Example 1

After water was poured into a reaction vessel equipped with a stirrer and an overflow pipe, an aqueous solution of sodium hydroxide was added thereto, and the liquid temperature was held at 50° C.

A nickel sulfate aqueous solution, a cobalt sulfate aqueous solution, and an aluminum sulfate aqueous solution were mixed such that the mole ratio of nickel atoms, cobalt atoms, and aluminum atoms reached 0.88:0.09:0.03, thereby obtaining a raw material liquid mixture.

Next, the raw material-mixed solution and an ammonium sulfate aqueous solution, as a complexing agent, were continuously added into the reaction vessel under stirring. An aqueous sodium hydroxide solution was added dropwise at appropriate times so that the pH of the solution in the reaction vessel reached 12.4 (measurement temperature: 40° C.), and a reaction precipitate 1 was obtained.

The reaction precipitate 1 was washed, dehydrated, dried, and sieved, and a metal composite hydroxide 1 containing Ni, Co, and Al was obtained.

The metal composite hydroxide 1 was held and heated at 650° C. for 5 hours in the atmospheric atmosphere and cooled to room temperature, thereby obtaining a metal composite oxide 1.

Lithium hydroxide was weighed so that the amount (mole ratio) of lithium atoms with respect to the total amount 1 of Ni, Co, and Al that were contained in the metal composite oxide 1 reached 1.10. The metal composite oxide 1 and lithium hydroxide were mixed with a mortar to obtain a mixture 1.

Next, the obtained mixture 1 (50 g) was injected into a small tubular furnace (manufactured by Motoyama Co., Ltd., trade name: MA-1848, inner diameter: 50 mm) and calcined by being held at 720° C. for 6 hours in an oxygen-containing atmosphere having an oxygen concentration of 95% to obtain a calcined product 1.

In an oxygen-containing atmosphere having an oxygen concentration of 99%, the calcined product 1 was discharged from the small tubular furnace after the calcining and cooled for 15 minutes by continuously blowing an air at a room temperature of 25° C. until the calcined product 1 reached 100° C. to obtain a cooled product 1. The average cooling rate in a temperature range from 600° C. to 150° C. during the cooling was 3000° C./h, the average cooling rate in a temperature range from 600° C. to 400° C. was 6000° C./h, and the average cooling rate in a temperature range from 400° C. to 150° C. was 2143° C./h.

The cooled product 1 was pulverized using a mortar until the BET specific surface area reached 1.00 $m^2$/g. After that, the cooled product 1 was washed with water and dried in a vacuum at 150° C. for 8 hours. Therefore, LiMO-1 powder was obtained. The composition was $Li[Li_{0.02}(Ni_{0.89}Co_{0.09}Al_{0.02})_{0.98}]O_2$.

Example 2

An experiment was performed by the same procedure as in Example 1 through the step of obtaining a mixture, and a mixture 2 was obtained.

Next, the obtained mixture 2 (50 g) was injected into a rotary kiln (manufactured by Tanabe Corporation, inner diameter: 300 mm) and calcined by being retained in an oxygen-containing atmosphere having an oxygen concentration of 95% at a rotation speed of 0.63 m/min and 720° C. for 2 hours, thereby obtaining a calcined product 2.

In an oxygen-containing atmosphere having an oxygen concentration of 99%, the calcined product 2 was made to flow in an air cooling-type rotary cooler (manufactured by Tanabe Corporation, inner diameter: 300 mm) rotated at 0.63 m/min and cooled for 120 minutes while decreasing the temperature until the calcined product 2 reached 100° C. Next, the calcined product 2 was discharged from the air cooling-type rotary cooler to obtain a cooled product 2. The average cooling rate in a temperature range from 600° C. to 150° C. during the cooling was 225° C./h, the average cooling rate in a temperature range from 600° C. to 400° C. was 400° C./h, and the average cooling rate in a temperature range from 400° C. to 150° C. was 167° C./h.

The cooled product 2 was pulverized using a disc mill (manufactured by Masuko Sangyo Co., Ltd., trade name: SUPER MASCOLLOIDER) until the BET specific surface area reached 1.50 $m^2$/g. The operating condition of the disc mill was 1200 rpm. After that, the cooled product 1 was washed with water and dried in a vacuum at 150° C. for 8 hours. Therefore, a powder of a lithium metal composite oxide 2 was obtained. The composition was $Li[Li_{0.03}(Ni_{0.89}Co_{0.09}Al_{0.02})_{0.97}]O_2$.

Example 3

An experiment was performed by the same procedure as in Example 1 through the calcining step, and a calcined product 3 was obtained.

In an oxygen-containing atmosphere having an oxygen concentration of 99%, the calcined product 3 was left to stand in the small tubular furnace after the calcining and cooled for 213 minutes while decreasing the temperature of the heater until the calcined product 3 reached 100° C. Next, the calcined product 3 was discharged from the small tubular furnace to obtain a cooled product 3. The average cooling rate in a temperature range from 600° C. to 150° C. during the cooling was 175° C./h, the average cooling rate in a temperature range from 600° C. to 400° C. was 175° C./h, and the average cooling rate in a temperature range from 400° C. to 150° C. was 175° C./h.

The cooled product 3 was pulverized using a mortar until the BET specific surface area reached 1.00 $m^2$/g. After that, the cooled product 1 was washed with water and dried in a vacuum at 150° C. for 8 hours. Therefore, LiMO-3 powder was obtained. The composition was $Li[Li_{0.03}(Ni_{0.89}Co_{0.09}Al_{0.02})_{0.97}]O_2$.

Comparative Example 1

An experiment was performed by the same procedure as in Example 1 through the calcining step, and a calcined product C1 was obtained.

In an oxygen-containing atmosphere having an oxygen concentration of 99%, the calcined product C1 was left to stand in the small tubular furnace after the calcining and cooled for 744 minutes while decreasing the temperature of the heater until the calcined product C1 reached 100° C. Next, the calcined product C1 was discharged from the small tubular furnace to obtain a cooled product C1. The average cooling rate in a temperature range from 600° C. to 150° C. during the cooling was 50° C./h, the average cooling rate in a temperature range from 600° C. to 400° C. was 50° C./h, and the average cooling rate in a temperature range from 400° C. to 150° C. was 50° C./h.

The cooled product C1 was pulverized using a mortar until the BET specific surface area reached 1.05 $m^2$/g. After that, the cooled product 1 was washed with water and dried in a vacuum at 150° C. for 8 hours. Therefore, LiMO-C1 powder was obtained. The composition was $Li[Li_{0.02}(Ni_{0.88}Co_{0.09}Al_{0.03})_{0.98}]O_2$.

Comparative Example 2

An experiment was performed by the same procedure as in Example 1 through the calcining step, and a calcined product C2 was obtained.

In an oxygen-containing atmosphere having an oxygen concentration of 99%, the calcined product C2 was left to stand in the small tubular furnace after the calcining and cooled for 213 minutes while decreasing the temperature of the heater until the calcined product C2 reached 100° C. Next, the calcined product C2 was discharged from the small tubular furnace to obtain a cooled product C2. The average cooling rate in a temperature range from 600° C. to 150° C.

during the cooling was 175° C./h, the average cooling rate in a temperature range from 600° C. to 400° C. was 175° C./h, and the average cooling rate in a temperature range from 400° C. to 150° C. was 175° C./h.

The cooled product C2 was pulverized using a mortar and a pin mill (manufactured by Mill System Co., Ltd., trade name: IMPACT MILL) until the BET specific surface area reached 1.59 $m^2$/g. The operating condition of the pin mill was 20000 rpm. After that, the cooled product 1 was washed with water and dried in a vacuum at 150° C. for 8 hours. Therefore, LiMO-C2 powder was obtained. The composition was $Li[Li_{0.02}(Ni_{0.89}Co_{0.09}Al_{0.02})_{0.98}]O_2$.

Comparative Example 3

An experiment was performed by the same procedure as in Comparative Example 2 through the cooling step, and a cooled product C3 was obtained.

The cooled product C3 was washed with water and dried in a vacuum at 150° C. for 8 hours. Therefore, LiMO-C3 powder was obtained. The composition was $Li[Li_{0.01}(Ni_{0.89}Co_{0.09}Al_{0.02})_{0.99}]O_2$.

The average cooling rates in the temperature range from 600° C. to 150° C., pulverizing methods, $I_1/I_2$, and BET specific surface areas after the pulverizing step of LIMO-1 to 3 of Examples 1 to 3 and LiMO-C1 to C3 of Comparative Examples 1 to 3, and the initial efficiency, discharge capacity at 10 C (denoted as 10 C discharge capacity in Table 1), and rate of the charge capacity at 0.5 CA in a case where the charge capacity at 0.2 CA was regarded as 100% (denoted as charging rate (0.5 C/0.2 C) in Table 1) of the coin-type half cell for which each LiMO was used are shown in Table 1.

surface area after pulverizing was outside the above-described range, it was not possible for one or more of the initial efficiency, the discharge capacity at 10 C, and the rate of the charge capacity at 0.5 CA in a case where the charge capacity at 0.2 CA was regarded as 100% to satisfy the above-described range.

INDUSTRIAL APPLICABILITY

According to the present invention, it is possible to provide LIMO enabling the obtainment of lithium secondary batteries having improved initial characteristics, output characteristics and charge characteristics when used as CAM and CAM, a positive electrode for a lithium secondary battery, and a lithium secondary battery for each of which this LiMO is used.

REFERENCE SIGNS LIST

1: Separator
2: Positive Electrode
3: Negative electrode
4: Electrode group
5: Battery can
6: Electrolytic solution
7: Top insulator
8: Sealing body
10: Lithium secondary battery
21: Positive electrode lead
31: Negative electrode lead
40: Production device
50: Calcining device

TABLE 1

|  | Example 1 | Example 2 | Example 3 | Comparative Example 1 | Comparative Example 2 | Comparative Example 3 |
|---|---|---|---|---|---|---|
| Average cooling rate in temperature range from 600° C. to 150° C. (° C./h) | 2000 | 225 | 175 | 50 | 175 | 175 |
| Pulverizing method | Mortar | Disc mill | Mortar | Mortar | Mortar + pin mill | Not pulverized |
| XRD area ratio $I_1/I_2$ | 1.66 | 3.16 | 1.55 | 1.52 | 1.68 | 1.63 |
| BET specific surface area ($m^2$/g) | 1.00 | 1.50 | 1.00 | 1.05 | 1.59 | 0.88 |
| Initial efficiency (%) | 87.1 | 88.1 | 87.0 | 87.2 | 86.7 | 87.4 |
| 10 C discharge capacity (mAh/g) | 13.9 | 11.9 | 11.9 | 11.4 | 11.4 | 13.6 |
| Charge rate (0.5 C/0.2 C) | 99.97 | 99.98 | 99.96 | 99.94 | 99.93 | 99.94 |

As shown in Table 1, when the average cooling rates in the temperature range from 600° C. to 150° C. were 150° C./h or faster and 3500° C./h or slower, and the cooled products were pulverized so that the BET specific surface areas reached 0.90 $m^2$/g or more and 1.55 $m^2$/g or less as in Examples 1 to 3, the initial efficiency of 87.0% or more, the discharge capacity at 10 C of 11.5 mAh/g or more, and the rate of the charge capacity at 0.5 CA of 99.95% or more in a case where the charge capacity at 0.2 CA was regarded as 100% were all satisfied.

On the other hand, in Comparative Example 1 in which the average cooling rate was outside the above-described range and Examples 2 and 3 in which the BET specific

51, 61: Supply port
52, 62: Discharge port
53, 63: Rotary cylinder
54: Heating means
55, 65: Pipe
60: Cooling device
64: Cooling means
70: Pulverizing device
100: Laminate
110: Positive electrode
111: Positive electrode active material layer
112: Positive electrode current collector
113: External terminal

120: Negative electrode
121: Negative electrode active material layer
122: Negative electrode current collector
123: External terminal
130: Solid electrolyte layer
200: Exterior body
200*a*: Opening portion
1000: All-solid-state lithium secondary battery

What is claimed is:

1. A method for producing a lithium metal composite oxide comprising:

a step of calcining, at 600° C. or higher, (a) a mixture of a lithium compound and a metal composite compound containing at least Ni, or (b) a reactant obtained by preliminarily calcining the mixture, to obtain a calcined product;

a step of cooling the calcined product from a calcining temperature in the step of obtaining the calcined product to 150° C. or lower to obtain a cooled product; and a step of pulverizing the cooled product such that a BET specific surface area becomes 0.90 to 1.55 m²/g, wherein, in the step of obtaining the cooled product, an average cooling rate in a temperature range from 600° C. to 150° C. is 150 to 3500° C./h, an average cooling rate in a temperature range from 600° C. to 400° C. in the step of obtaining the cooled product is 243 to 7357° C./h, an average cooling rate in a temperature range from 400° C. to 150° C. in the step of obtaining the cooled product is 10 to 3500° C./h, and the average cooling rate in the temperature range from 600° C. to 400° C. and the average cooling rate in the temperature range from 400° C. to 150° C. are different, and the average cooling rate in the temperature range from 400° C. to 150° C. is smaller than the average cooling rate in the temperature range from 600° C. to 400° C., and a temperature difference between the average cooling rate from 600-400° C. and the average cooling rate from 400-150° C. is 233° C./h to 3857° C./h.

2. The method for producing the lithium metal composite oxide according to claim 1, wherein the lithium metal composite oxide is represented by a composition formula (I), $$Li[Li_x(Ni_{(1-y-z)}CO_yX_z)_{1-x}]O_2 \qquad (I)$$

in the formula (I), X represents one or more elements selected from the group consisting of Mn, Cu, Ti, Mg, Al, W, B, Mo, Nb, Zn, Sn, Zr, Ga, and V, and −0.1≤x≤0.2, 0≤y≤0.5, 0≤z≤0.8, and y+z<1 are satisfied.

3. The method for producing the lithium metal composite oxide according to claim 1, wherein the step of obtaining the calcined product and the step of obtaining the cooled product are performed in an oxygen-containing atmosphere.

4. The method for producing the lithium metal composite oxide according to claim 3, wherein an oxygen concentration in the oxygen-containing atmosphere in the step of obtaining the cooled product is higher than an oxygen concentration in the oxygen-containing atmosphere in the step of obtaining the calcined product.

5. The method for producing the lithium metal composite oxide according to claim 1, wherein the step of obtaining the calcined product is performed using a rotary kiln, and the step of obtaining the cooled product is performed using one of a rotary cooler and a fluidized-bed cooler.

6. The method for producing the lithium metal composite oxide according to claim 5, wherein the step of obtaining the cooled product is performed using the rotary cooler, and a ratio of a volume of a rotary cylinder of the rotary cooler to a volume of a rotary cylinder of the rotary kiln is 0.05 to 2.

7. The method for producing the lithium metal composite oxide according to claim 6, wherein a rotation speed of the rotary cooler in the step of obtaining the cooled product is 0.4 to 130 m/min.

8. The method for producing the lithium metal composite oxide according to claim 1, wherein the step of pulverizing the cooled product is performed using a disc mill or a pin mill.

9. The method for producing the lithium metal composite oxide according to claim 8, wherein, in the step of pulverizing the cooled product, the disc mill is operated such that a rotation speed becomes 120 to 12000 rpm, and the cooled product is pulverized.

10. The method for producing the lithium metal composite oxide according to claim 8, wherein, in the step of pulverizing the cooled product, the pin mill is operated such that a rotation speed becomes 300 rpm or more and less than 20000 rpm, and the cooled product is pulverized.

11. The method for producing the lithium metal composite oxide according to claim 2, wherein the step of obtaining the calcined product and the step of obtaining the cooled product are performed in an oxygen-containing atmosphere.

12. The method for producing the lithium metal composite oxide according to claim 2, wherein X represents one or more elements selected from the group consisting of Cu, Ti, Mg, Al, W, B, Mo, Nb, Zn, Sn, Zr, Ga, and V.

13. The method for producing the lithium metal composite oxide according to claim 2, wherein z=0.

14. The method for producing the lithium metal composite oxide according to claim 1, wherein the average cooling rate in the temperature range from 600° C. to 400° C. is 6000 to 7357° C./h.

* * * * *